US006704607B2

United States Patent
Stone et al.

(10) Patent No.: US 6,704,607 B2
(45) Date of Patent: Mar. 9, 2004

(54) METHOD AND APPARATUS FOR CONTROLLABLY POSITIONING A SOLAR CONCENTRATOR

(75) Inventors: Kenneth Wayne Stone, Huntington Beach, CA (US); James A. Kiefer, Laguna Hills, CA (US)

(73) Assignee: The Boeing Company, Seattle, WA (US)

( * ) Notice: Subject to any disclaimer, the term of this patent is extended or adjusted under 35 U.S.C. 154(b) by 266 days.

(21) Appl. No.: 09/862,757

(22) Filed: May 21, 2001

(65) Prior Publication Data

US 2003/0045949 A1 Mar. 6, 2003

(51) Int. Cl.[7] .............................................. G05B 19/18
(52) U.S. Cl. ........................... 700/56; 700/59; 700/61; 700/302; 250/203.4; 250/548; 126/574; 126/601; 356/139.01
(58) Field of Search .............................. 700/56, 61, 64, 700/302, 59, 62; 126/574, 601; 702/86, 87, 94, 95, 150; 250/203.3, 203.4, 548, 559.3; 353/3; 356/139.01, 152.1

(56) References Cited

U.S. PATENT DOCUMENTS

| | | | |
|---|---|---|---|
| 4,013,885 A | * 3/1977 | Blitz | 250/203.4 |
| 4,082,947 A | * 4/1978 | Haywood et al. | 250/203.4 |
| 4,202,321 A | * 5/1980 | Volna | 126/605 |
| 4,215,410 A | * 7/1980 | Weslow et al. | 700/61 |
| 4,242,580 A | 12/1980 | Kaplow et al. | 250/203.4 |
| 4,320,288 A | 3/1982 | Schlarlack | 250/203.4 |
| 4,354,484 A | 10/1982 | Malone et al. | 126/602 |
| 4,440,150 A | * 4/1984 | Kaehler | 126/602 |
| 4,519,382 A | * 5/1985 | Gerwin | 126/578 |
| 4,564,275 A | * 1/1986 | Stone | 353/3 |
| 4,583,520 A | 4/1986 | Dietrich et al. | 126/606 |
| 4,612,488 A | 9/1986 | Uhlemann et al. | 318/582 |
| 4,710,618 A | * 12/1987 | Matsumoto et al. | 250/203.4 |
| 5,184,139 A | 2/1993 | Hirako et al. | 342/354 |
| 5,313,212 A | 5/1994 | Ruzicka | 342/101 |
| 5,485,156 A | 1/1996 | Manseur et al. | 342/77 |
| 5,493,392 A | 2/1996 | Blackmon et al. | 356/139.03 |
| 5,758,938 A | 6/1998 | Osterwisch | 353/3 |
| 5,791,598 A | 8/1998 | Rodden et al. | 244/165 |
| 5,929,530 A | 7/1999 | Stone | 290/2 |
| 5,978,716 A | 11/1999 | Kamel et al. | 701/13 |
| 5,982,481 A | 11/1999 | Stone et al. | 356/152.2 |
| 2002/0198001 A1 | * 12/2002 | Bajikar | 455/456 |

FOREIGN PATENT DOCUMENTS

SU 983-398 A 1/1982 .............. F24J/3/02

* cited by examiner

*Primary Examiner*—Anil Khatri
*Assistant Examiner*—Crystal J. Barnes
(74) *Attorney, Agent, or Firm*—Alston & Bird LLP

(57) ABSTRACT

A method, apparatus, control system and computer program product are provided for controllably positioning the solar concentrator. The method, apparatus, control system and computer program product determine the respective errors generated by more and different error sources than prior techniques, including error sources selected from the group consisting of a gravitational residue error, an elevation transfer function error and an error attributable to atmospheric refraction. Based upon the respective errors, the method, apparatus, control system and computer program product determine an elevation command and an azimuth command to compensate for the vertical error and the horizontal error between the centerline of the solar concentrator and the sun reference vector such that the solar concentrator can be more precisely positioned, thereby improving the efficiency with which the solar concentrator collects solar energy.

30 Claims, 19 Drawing Sheets

$$\begin{bmatrix}
\begin{array}{l}\cos\delta_2\cos\lambda\cos\omega\cos\gamma_1 + \\ \cos\delta_2\cos\lambda\sin\omega\sin\gamma_1\sin\gamma_2 + \\ \cos\delta_2\sin\lambda\sin\delta_1\sin\omega\cos\gamma_1 - \\ \cos\delta_2\sin\lambda\sin\delta_1\cos\omega\sin\gamma_1\sin\gamma_2 + \\ \cos\delta_2\sin\lambda\cos\delta_1\sin\gamma_1\cos\gamma_2 - \\ \sin\delta_2\cos\delta_1\sin\omega\cos\gamma_1 + \\ \sin\delta_2\cos\delta_1\cos\omega\sin\gamma_1\sin\gamma_2 + \\ \sin\delta_2\sin\delta_1\sin\gamma_1\cos\gamma_2\end{array} &
\begin{array}{l}\cos\delta_2\cos\lambda\cos\omega\cos\gamma_2 - \\ \cos\delta_2\sin\lambda\sin\delta_1\cos\omega\cos\gamma_2 + \\ \cos\delta_2\sin\lambda\cos\delta_1\cos\gamma_1\sin\gamma_2 + \\ \sin\delta_2\cos\delta_1\cos\omega\cos\gamma_2 + \\ \sin\delta_2\sin\delta_1\sin\gamma_1\end{array} &
\begin{array}{l}-\cos\delta_2\cos\lambda\cos\omega\sin\gamma_1 + \\ \cos\delta_2\cos\lambda\sin\omega\cos\gamma_1\sin\gamma_2 - \\ \cos\delta_2\sin\lambda\sin\delta_1\sin\omega\sin\gamma_1 - \\ \cos\delta_2\sin\lambda\sin\delta_1\cos\omega\cos\gamma_1\sin\gamma_2 + \\ \cos\delta_2\sin\lambda\cos\delta_1\cos\gamma_1\cos\gamma_2 + \\ \sin\delta_2\cos\delta_1\sin\omega\sin\gamma_1 + \\ \sin\delta_2\cos\delta_1\cos\omega\cos\gamma_1\sin\gamma_2 + \\ \sin\delta_2\sin\delta_1\cos\gamma_1\cos\gamma_2\end{array} \\
\hline
\begin{array}{l}-\sin\delta_2\cos\lambda\cos\omega\cos\gamma_1 - \\ \sin\delta_2\cos\lambda\sin\omega\sin\gamma_1\sin\gamma_2 - \\ \sin\delta_2\sin\lambda\sin\delta_1\sin\omega\cos\gamma_1 + \\ \sin\delta_2\sin\lambda\sin\delta_1\cos\omega\sin\gamma_1\sin\gamma_2 - \\ \sin\delta_2\sin\lambda\cos\delta_1\sin\gamma_1\cos\gamma_2 - \\ \cos\delta_2\cos\delta_1\sin\omega\cos\gamma_1 + \\ \cos\delta_2\cos\delta_1\cos\omega\sin\gamma_1\sin\gamma_2 + \\ \cos\delta_2\sin\delta_1\sin\gamma_1\cos\gamma_2\end{array} &
\begin{array}{l}-\sin\delta_2\cos\lambda\sin\omega\cos\gamma_2 + \\ \sin\delta_2\sin\lambda\sin\delta_1\cos\omega\cos\gamma_2 + \\ \sin\delta_2\sin\lambda\cos\delta_1\cos\gamma_1\sin\gamma_2 + \\ \cos\delta_2\cos\delta_1\cos\omega\cos\gamma_2 + \\ \cos\delta_2\sin\delta_1\sin\gamma_2\end{array} &
\begin{array}{l}-\sin\delta_2\cos\lambda\cos\omega\sin\gamma_1 - \\ \sin\delta_2\cos\lambda\sin\omega\cos\gamma_1\sin\gamma_2 + \\ \sin\delta_2\sin\lambda\sin\delta_1\sin\omega\sin\gamma_1 + \\ \sin\delta_2\sin\lambda\sin\delta_1\cos\omega\cos\gamma_1\sin\gamma_2 + \\ \sin\delta_2\sin\lambda\cos\delta_1\cos\gamma_1\cos\gamma_2 + \\ \cos\delta_2\cos\delta_1\sin\omega\sin\gamma_1 + \\ \cos\delta_2\cos\delta_1\cos\omega\cos\gamma_1\sin\gamma_2 + \\ \cos\delta_2\sin\delta_1\cos\gamma_1\cos\gamma_2\end{array} \\
\hline
\begin{array}{l}-\sin\lambda\cos\omega\cos\gamma_1 - \\ \sin\lambda\sin\omega\sin\gamma_1\sin\gamma_2 + \\ \cos\lambda\sin\delta_1\sin\omega\cos\gamma_1 - \\ \cos\lambda\sin\delta_1\cos\omega\sin\gamma_1\sin\gamma_2 + \\ \cos\lambda\cos\delta_1\sin\gamma_1\cos\gamma_2\end{array} &
\begin{array}{l}-\sin\lambda\cos\omega\cos\gamma_2 - \\ \cos\lambda\sin\delta_1\cos\omega\cos\gamma_2 - \\ \cos\lambda\cos\delta_1\sin\gamma_2\end{array} &
\begin{array}{l}\sin\lambda\cos\omega\sin\gamma_1 - \\ \sin\lambda\sin\omega\cos\gamma_1\sin\gamma_2 - \\ \cos\lambda\sin\delta_1\sin\omega\sin\gamma_1 - \\ \cos\lambda\sin\delta_1\cos\omega\cos\gamma_1\sin\gamma_2 + \\ \cos\lambda\cos\delta_1\cos\gamma_1\cos\gamma_2\end{array}
\end{bmatrix} = Tr\text{-}t$$

FIG. 8

METHOD AND APPARATUS FOR CONTROLLABLY POSITIONING A SOLAR CONCENTRATOR

FIELD OF THE INVENTION

The present invention relates generally to methods and apparatus for controllably positioning a solar concentrator and, more particularly, to methods and apparatus for controllably positioning a solar concentrator that take into account at least one of a gravitational residue error, azimuth transfer function, and elevation transfer function error and an error due to atmospheric refraction.

BACKGROUND OF THE INVENTION

There is currently a large domestic and international market for clean non-polluting generated grid and remote electrical power, such as the electrical power generated by solar energy generating systems. This demand is anticipated only to grow. For example, over the next 12 years, the average growth of power consumption in California is estimated to be 700 MW per year, while Arizona consumers are anticipated to demand an additional 200 MW per year between the years 2000 and 2010. In addition, the state of Nevada has one of the fastest growing energy needs per capita in the United States with its electrical needs estimated to grow in excess of 200 MW per year. In the solar belt states alone, the estimated growth is anticipated to be more than 1000 MW per year. Furthermore, an estimate by the World Bank of the international electrical market in the solar belt countries is for growth of more than 2000 MW year.

Of this growth in power consumption, at least a portion will be solar energy. For example, the state of Arizona has decreed that 1% of all generated electrical power must be solar generated. This requirement creates the need for 350 MW of grid electricity in this state from solar energy alone. Other states in the solar belt, such as California, Nevada, New Mexico, etc., have or are expecting similar legislation.

A variety of solar-to-electrical energy conversion systems have been developed with the most cost-effective systems being concentrating solar energy systems that focus the energy of the sun to a relatively small area. One exemplary concentrating solar energy system is a Stirling dish developed by McDonnell Douglas Corporation. A Stirling dish includes a plurality of reflective facets disposed side-by-side upon a support frame to define a reflective surface. The reflective surface typically has a parabolic or spherical shape. The parabolic reflective surface of the Stirling dish concentrates the incident solar energy upon a power conversion unit that is located at the focal point of the reflective surface. In this regard, the power conversion unit is generally mounted upon the distal end of a support arm that extends forwardly of the Stirling dish. The support frame that carries the plurality of reflective facets and the support arm that carries the power conversion unit are mounted upon a pedestal which, in turn, is secured to a foundation within the earth. The pedestal permits the Stirling dish to move in both an azimuth rotational plane and an elevation rotational plane such that the Stirling dish can track the sun throughout the day. Thus, the Stirling dish also generally includes an azimuthal drive and an elevational drive, including an elevation activator, for providing the desired movement in response to azimuth and elevation commands issued by a controller or the like. Typically, these commands attempt to drive one Stirling dish to a position at which a centerline defined by the reflective surface is aligned with the sun. Other types of concentrating solar energy systems exist, however, including heliostats and other sun tracking solar concentrators.

There are two general types of tracking control systems for use with concentrating solar energy systems, namely, open loop and closed loop control systems. In a closed loop tracking control system, a sun sensor is aligned to the centerline defined by the reflective surface. As such, the sun sensor generates error signals between the centerline of the reflective surface and the line-of-sight to the sun, i.e., the sun reference vector. While closed loop tracking control systems can be effective, closed loop tracking control systems are generally quite expensive due to the addition of a sun sensor and the attendant cabling, additional interface electronics and increased operational and maintenance costs attributable to the additional hardware. Further, closed loop tracking control systems have difficulty maintaining track during periods of cloud cover. In this regard, if the reflective surface is not pointing at the sun when the sun comes out from behind the clouds, the concentrating solar energy system may be damaged. As such, open loop tracking commands must be calculated during the period of time in which the sun is behind the clouds. Additionally, further problems arise in instances in which the face or lens of the sun sensor becomes dirty, such as from dust, sand or other airborne particles. In this regard, a sun sensor relies upon the shading of the solar cells to obtain an error voltage. As such, a sun sensor having a dirty lens will unevenly illuminate the solar cells which, in turn, creates tracking errors and also loss of track during low sun irradiance levels. Closed loop tracking control systems also suffer from an additional cost of aligning the sun sensor to the centerline defined by the reflective surface and maintaining this alignment over time. Furthermore, the sun sensor oftentimes serves as a roosting place for birds which can cause additional problems, by altering the alignment of the sun sensor or soiling the lens of the sun sensor. As such, most concentrating solar energy systems utilize an open loop tracking control system.

In an open loop tracking control system, the position of the sun is calculated by a set of ephemeris equations. The reflective surface is then commanded to point toward the position of the sun. As a result of the open loop nature of this system, there is no feedback from the solar concentrator that the reflective surface is actually pointing at the sun. Unfortunately, the command coordinate system, i.e., the coordinate system in which the commands that direct the position of the solar concentrator are formulated, and the concentrator coordinate system, i.e., the actual coordinate system defined by the physical construction of the solar concentrator, are generally somewhat misaligned. As such, the centerline defined by the reflective surface may not be pointing directly at the sun even though commands have been issued that would have caused the reflective surface to point at the sun if the concentrator coordinate system and the command coordinate system were identical. Typical sources of error that will cause the misalignment of the command coordinate system and the concentrator coordinate system are pedestal/foundation tilt errors, elevation pivot point manufacturing tolerances, azimuth and elevation reference errors, gravity bending of the structure, atmospheric bending of the sun rays, reflectivity surface misalignment errors, elevation actuator offset errors and errors inherent in the mathematical model utilized by the control system.

The deleterious effect of these errors can be reduced by increasing the manufacturing tolerances and the installation tolerances. However, the increase in these tolerances will greatly increase the cost of a concentrating solar energy system such that the resulting concentrating solar energy system will no longer be economically competitive with either non-concentrating solar systems or conventional power systems. The deleterious effect of these errors can also be reduced by modifying the pointing commands that position the reflective surface in an attempt to compensate for the misalignment errors.

In this regard, some concentrating solar energy systems automatically provide a fixed bias of correction in the azimuth direction and a fixed bias of correction in the elevation direction. While the application of a fixed amount of error correction is somewhat helpful, the azimuth and elevation errors vary throughout the day and year as the position of the sun and the solar concentrator changes. In this regard, FIGS. 1A and 1B depict the elevation and azimuth track errors in degrees as a function of azimuth position in degrees from due south. In this regard, both the azimuth and elevation track errors vary by about 0.6 degrees such that incorporation of a fixed correction value, such as an average error correction value, would still subject the concentrating solar energy system to a substantial amount of uncorrected error in both the azimuth and elevation rotational planes.

In order to take into account variations in the azimuth and elevation errors throughout the day, one system manually determines the errors attributable to azimuth tilt and gravity bending. To determine the errors attributable to azimuth tilt, a leveling device, such as an inclinometer, is placed on the upper part of the rotating structure, i.e., the structure that rotates about the pedestal, and the angle is noted. The solar concentrator is then rotated between five and ten degrees and the tilt angle is again measured. This process is repeated in relatively small steps until the solar concentrator is rotated through 360 degrees. The data is then plotted and the tilt parameters are estimated from the plotted data. Similarly, the errors attributable to gravity bending are determined by mounting an inclinometer on the elevation rotating part of the solar concentrator, i.e., the structure above the elevation pivot point. The solar concentrator is then commanded to an angle and the actual angle is measured with the inclinometer. The solar concentrator is then commanded to another elevation angle which is between about five and ten degrees greater than the initial elevation angle. This process is continued until measurement data has been obtained for elevation angles from 0 degrees to 90 degrees. The measured angles are then subtracted from the commanded elevation angles to obtain the error attributable to gravity bending. This data is then curve fit as a function of the elevation angle and the resulting curve is utilized to adjust the commanded elevation angle in order to correct for errors attributable to gravity bending.

While this technique takes into account the variations in the errors attributable to azimuth tilt and gravity bending throughout the day, this technique does not recognize that these errors, as well as the other errors to which the solar concentrator is subjected, vary not only throughout the day, but also from day to day and season to season as the relative position of the sun in the sky changes. Additionally, this technique only takes into account two tracking errors, namely, errors attributable to azimuth tilt and errors attributable to gravity bending, thereby ignoring the effects of a number of other error sources, such as azimuth reference error, errors attributable to reflective surface non-orthogonality, elevation reference position error, elevation rotational tilt errors and the like. Moreover, this technique requires substantial manual labor in the field in order to collect the necessary data.

Another technique for measuring the misalignment errors and for modifying the pointing commands is described by U.S. Pat. No. 4,564,275 to Kenneth W. Stone, the contents of which are incorporated herein in their entirety. This technique automatically aligns one or more heliostats by comparing the actual sun beam centroid position to a command reference position to determine the error in the sun beam centroid location. This is done several times over the day depending upon the required accuracy. The sun beam centroid position error is then analyzed to correlate the error to errors in the track alignment system of the heliostat. In this regard, the technique described by U.S. Pat. No. 4,564,275 takes into account errors attributable to the non-orthogonality of the facets of the reflective surface, errors in the elevation and azimuth reference positions and errors in the azimuth rotational tilt. Based upon the errors, the command reference position is updated to automatically correct for the errors. While the technique described by U.S. Pat. No. 4,564,275 represents a substantial improvement in open loop tracking control systems for solar concentrators, it would be desirable to further improve the open loop tracking control system in order to even more accurately align the centerline defined by a reflective surface with the sun reference vector, thereby capturing a greater percentage of the energy delivered by the sun and increasing the efficiency of the concentrating solar energy system.

SUMMARY OF THE INVENTION

A method, apparatus, control system and computer program product are provided for controllably positioning the solar concentrator. Advantageously, the various embodiments of the present invention determine the respective errors generated by more and different error sources than prior techniques, including error sources selected from the group consisting of a gravitational residue error, an elevation transfer function error and an error attributable to atmospheric refraction. Based upon the respective errors, the various embodiments of the present invention determine an elevation command and an azimuth command to compensate for the vertical error and the horizontal error between the centerline of the solar concentrator and the sun reference vector such that the solar concentrator can be more precisely positioned, thereby improving the efficiency with which the solar concentrator collects solar energy.

According to one embodiment of the present invention, a control system is provided for positioning a solar concentrator. The control system includes an input section for receiving signals representative of the vertical error and the horizontal error between the centerline of the solar concentrator and the sun reference vector. In one embodiment, the input section repeatedly receives signals representative of the vertical error and the horizontal error at a plurality of different times throughout the day such that the solar concentrator can be repositioned throughout the day as necessary to optimize its collection of the solar energy. The control system also includes a processing element for determining the elevation command and the azimuth command to compensate for the vertical error and the horizontal error. In one advantageous embodiment, the processing element is comprised of a computer program product having a computer-readable storage medium with computer-readable program code embodied therein for performing the various functions of the processing element. However, the processing element can be embodied in other manners, if so desired.

Regardless of its physical embodiment, the processing element determines respective errors generated by a plurality of error sources that contribute to the vertical error and/or the elevation error. According to the present invention, the plurality of error sources include at least one error source selected from a group consisting of a gravitational residue error, an elevation transfer function error and an error due to atmospheric refraction. In one embodiment, the processing element determines the respective errors by collectively determining a gravitational residue error g, an elevation transfer function error e and an error due to atmospheric refraction. The processing element can also determine additional errors by individually determining each of a first azimuth rotational tilt error $\gamma_1$, a second azimuth rotational tilt error $\gamma2$, a first elevation rotational tilt error $\phi$, a second elevation rotational tilt error $\delta_1$ and a reflective surface non-orthogonality error $\delta_2$.

The processing element also determines the elevation command and the azimuth command at least partially based upon the respective errors generated by the plurality of error sources. In one advantageous embodiment, the processing element determines the elevation command by determining an elevation command angle $\Psi c$ as follows: $\Psi_c$ $\sin^{-1}(\sin \gamma_1 \cos \Psi r \cos \Phi r - \sin \gamma_2 \cos \Psi r \sin \Phi r + \sin \Psi r$ $)-d\Psi$ wherein $\gamma_1$ and $\gamma_2$ are azimuth rotational tilt errors, $\Phi r$ and $\Psi r$ are elevation and azimuth angles, respectively, in an inertial reference system that are required to align the centerline of the solar concentrator and a sun reference vector, and $d\Psi$ is a combination of the elevation transfer function error, the gravitational residual error, and the error due to atmospheric refraction.

Likewise, the processing element of this advantageous embodiment preferably determines the azimuth command by determining an azimuth command angle $\Phi c$ as follows:

$$\Phi_c = \cos^{-1}\left[\frac{AC+BD}{A^2+B^2}\right] - \Phi_e$$

wherein A, B, C and D are defined as follows:
A=$\cos \lambda \cos \delta_2$
B=$\cos \delta_1 \sin \delta_2 - \sin \delta_1 \cos \delta_2 \sin \lambda$
C=$\cos \gamma_1 \cos \Psi r \cos \Phi r - \sin \gamma_1 \sin \Psi r$
D=$\sin \gamma_1 \sin \gamma_2 \cos \Psi r \cos \Phi r + \cos \gamma_2 \cos \Psi r \sin \Phi r + \sin \Psi r \cos \gamma_1 \sin \gamma_2$
wherein $\lambda$ is defined as follows:

$\lambda = \Psi_c - \Psi_e + g(\Psi_c) + e(\Psi_c) + r(\Psi_c)$ wherein $\Psi c$ is an elevation command angle, $\Psi e$ is an elevation reference position error, $g(\Psi)$ is a gravitational residue error, $e(\Psi)$ is an elevation transfer function error and $r(\Psi)$ is an error due to atmospheric refraction, and wherein $\delta_1$ is an elevation rotational tilt error, $\delta_2$ is a reflective surface non-orthogonality error, $\gamma_1$ and $\gamma_2$ are azimuth rotational tilt errors and $\Phi r$ and $\Psi r$ are elevation and azimuth angles, respectively, in an inertial reference system that are required to align the centerline of the solar concentrator and a sun reference vector.

The control system also includes an output section for providing signals representative of the elevation command and the azimuth command. The elevation command and the azimuth command can then be utilized to controllably position the solar concentrator to compensate for the vertical error and the horizontal error between the centerline of the solar concentrator and sun reference vector.

According to another aspect of the present invention, an apparatus for controllably positioning the solar concentrator is provided that includes a measurement system for determining the vertical error and the horizontal error between the centerline of the solar concentrator and the sun reference vector, a processing element as described above in conjunction with the control system, and a positioning mechanism for positioning the solar concentrator based upon the elevation command and the azimuth command in order to compensate for the vertical error and the horizontal error.

The measurement system may be either a sun sensor or a digital image radiometer. Alternatively, the measurement system may be adapted to move the solar concentrator from a nominal position to an aligned position at which the difference between the gas temperatures of each quadrant of the solar concentrator is minimized. Based upon the horizontal and vertical distances that the solar concentrator is moved from the nominal position to the aligned position, the measurement system of this embodiment can determine the horizontal and vertical errors, respectively. In yet another embodiment, the measurement system may be adapted to move the solar concentrator from a nominal position to an aligned position at which the maximum power factor is obtained. According to this embodiment, the measuring system is further adapted to determine the horizontal and vertical distances that the solar concentrator is moved from the nominal position to the aligned position in order to determine the horizontal and vertical errors, respectively.

According to another aspect of the present invention, a method of controllably positioning the solar concentrator is provided. In this regard, the method initially determines the vertical and horizontal errors between the centerline of the solar concentrator and the sun reference vector. The method then determines an elevation command and an azimuth command to compensate for the vertical and horizontal errors, respectively. In this regard, the method initially determines respective errors generated by a plurality of error sources that contribute to one or more of the vertical and horizontal errors. As described above, the plurality of error sources include at least one of the gravitational residue error g, the elevation transfer function error e and the error r due to atmospheric refraction. The elevation command and the azimuth command are then determined based at least in part upon the respective errors generated by the plurality of error sources. Based upon the elevation command and the azimuth command, the solar concentrator can be positioned to compensate for the vertical and horizontal errors.

By taking into account the errors generated by a number of error sources including error sources not previously considered by open loop tracking control systems and methods, such as the gravitational residue error g, the elevation transfer function error e and the error r due to atmospheric refraction, the method, apparatus, control system and computer program product of the present invention can more precisely position the solar concentrator such that the centerline of the solar concentrator is aligned with the sun reference vector. As such, the efficiency with which the solar concentrator collects the solar energy is improved. By repeating this process at a number of different times throughout the day, various embodiments of the present invention can repeatedly optimize the performance of the solar concentrator throughout the day to obtain much better performance than conventional systems that utilize the same average correction factor throughout the entire day everyday. Still further, by implementing much of the functionality of the open loop control methodology of the present invention in software, the resulting apparatus is competitive in cost with conventional systems and can be readily reconfigured, if necessary.

BRIEF DESCRIPTION OF THE DRAWINGS

Figure 1B:
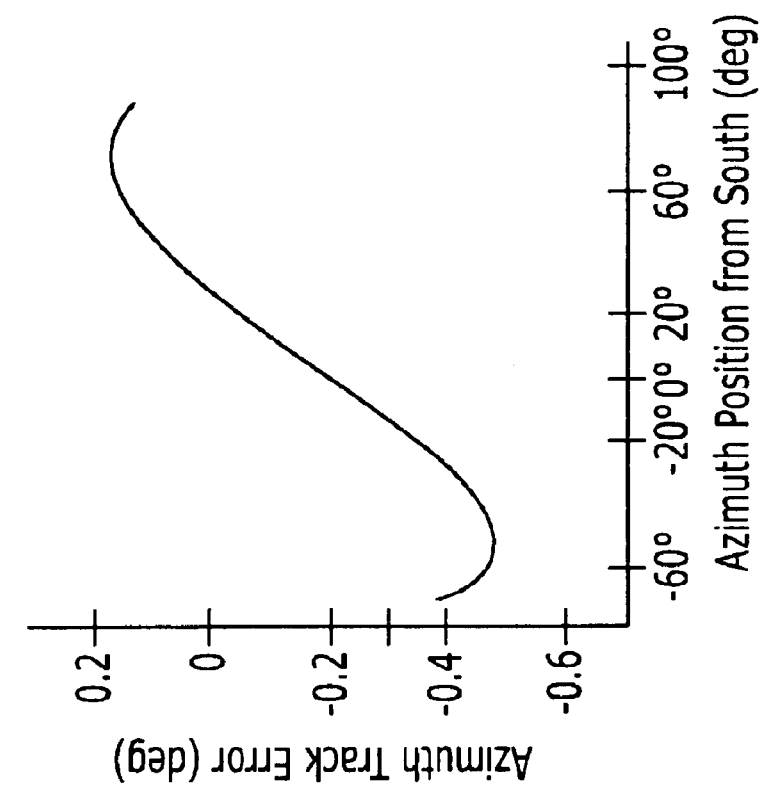
Figure 1A:
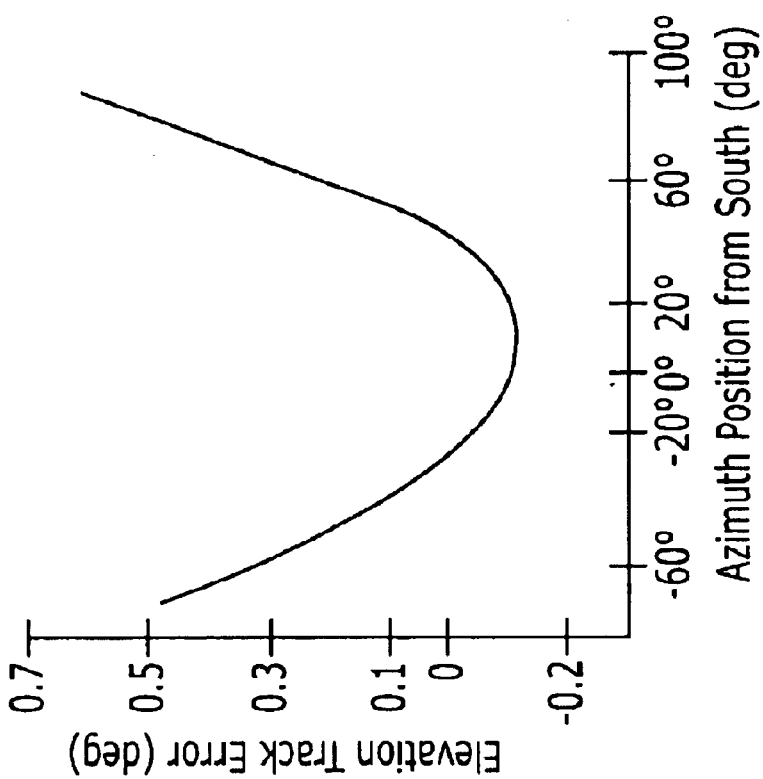
Figure 2:
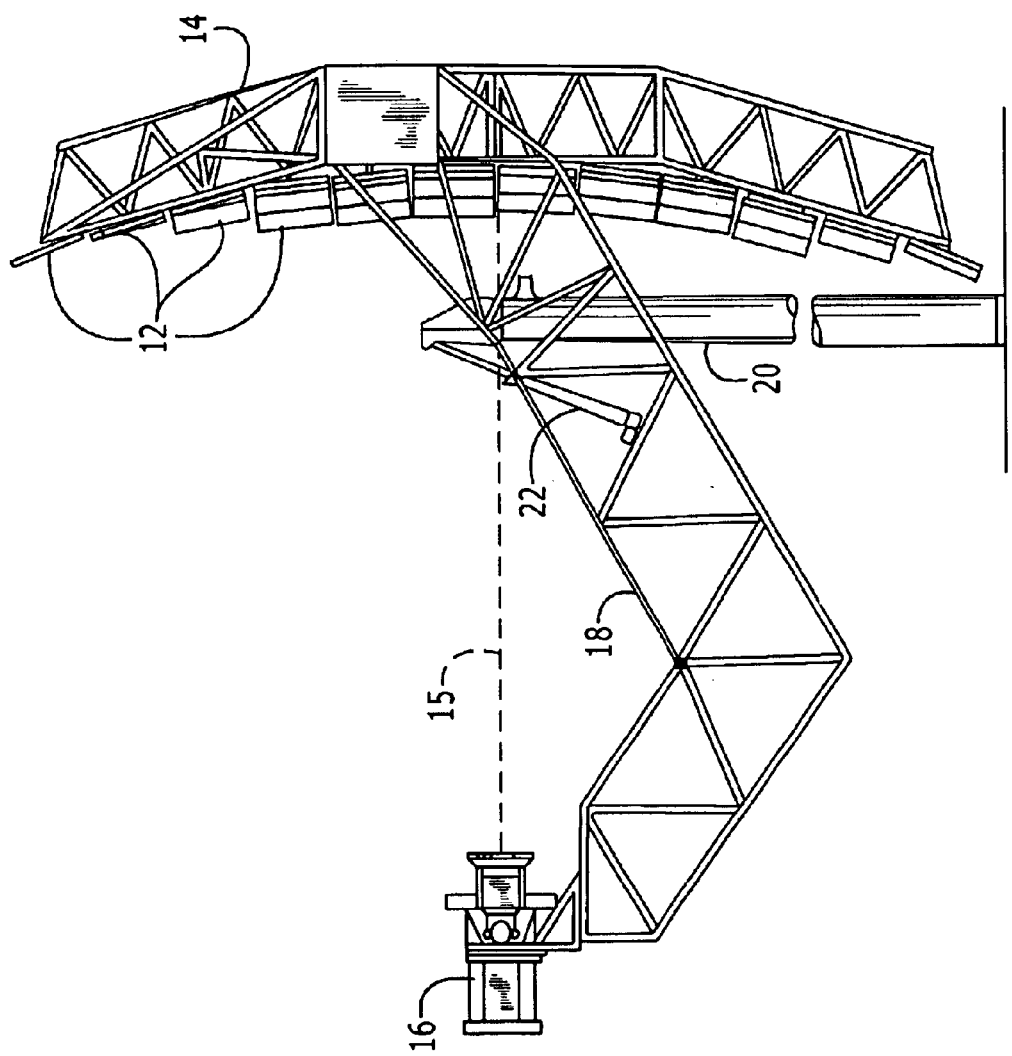
Figure 3:
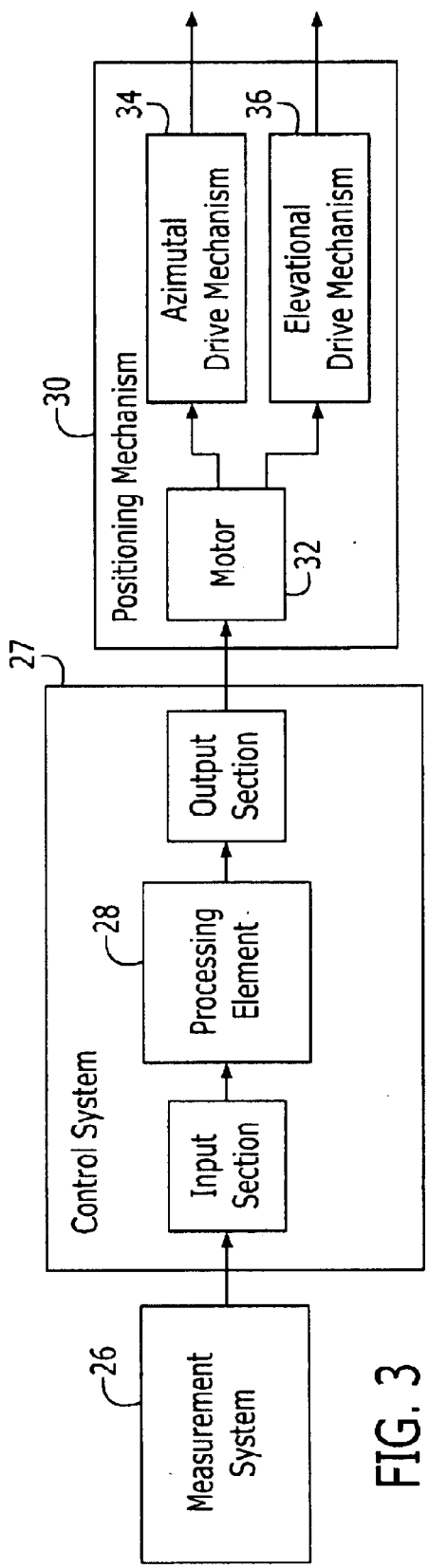
Figure 4:
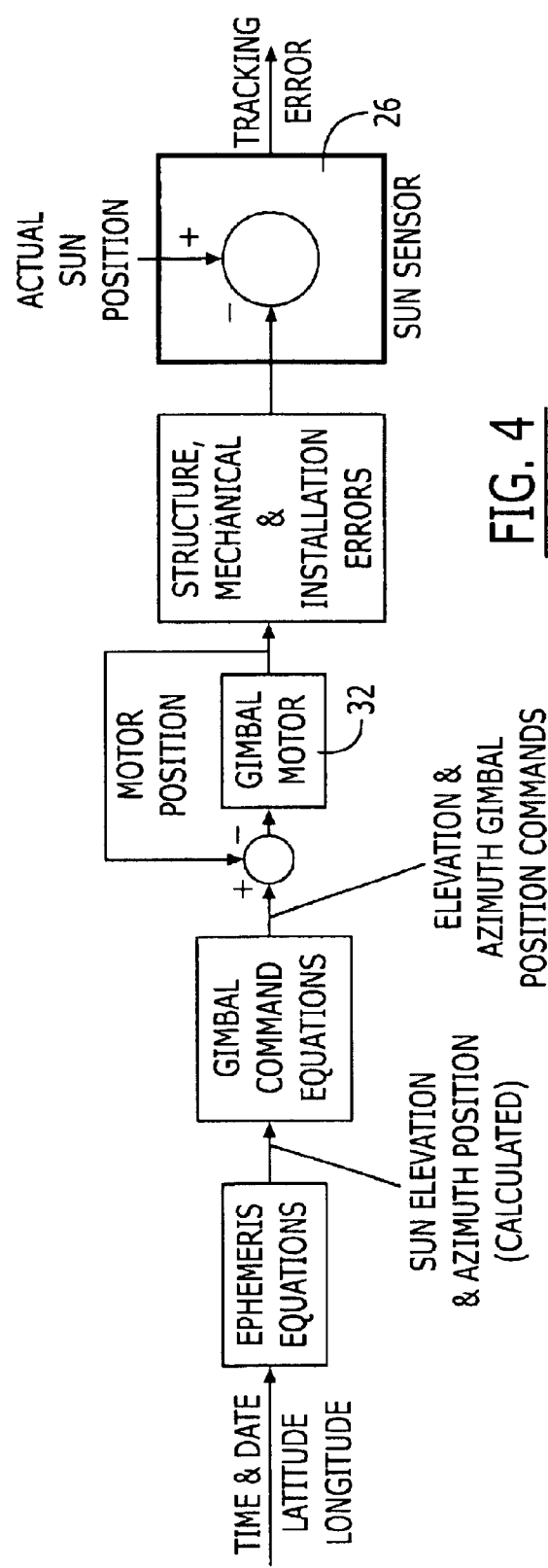
Figure 5:
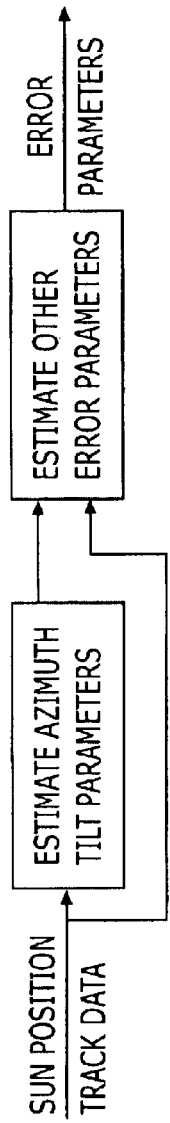
Figure 6:
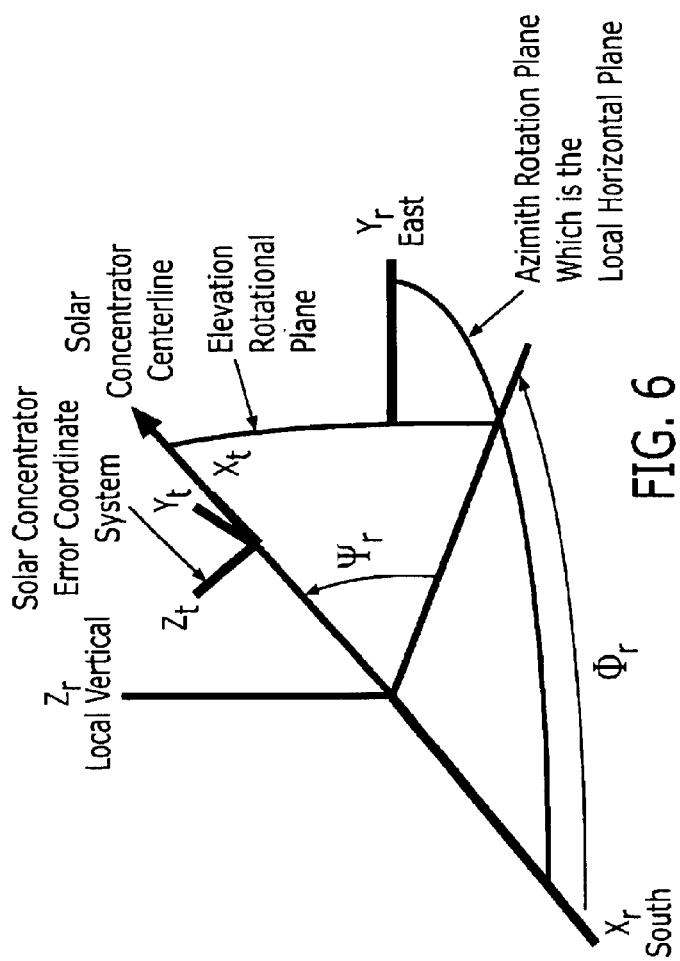
Figure 7:
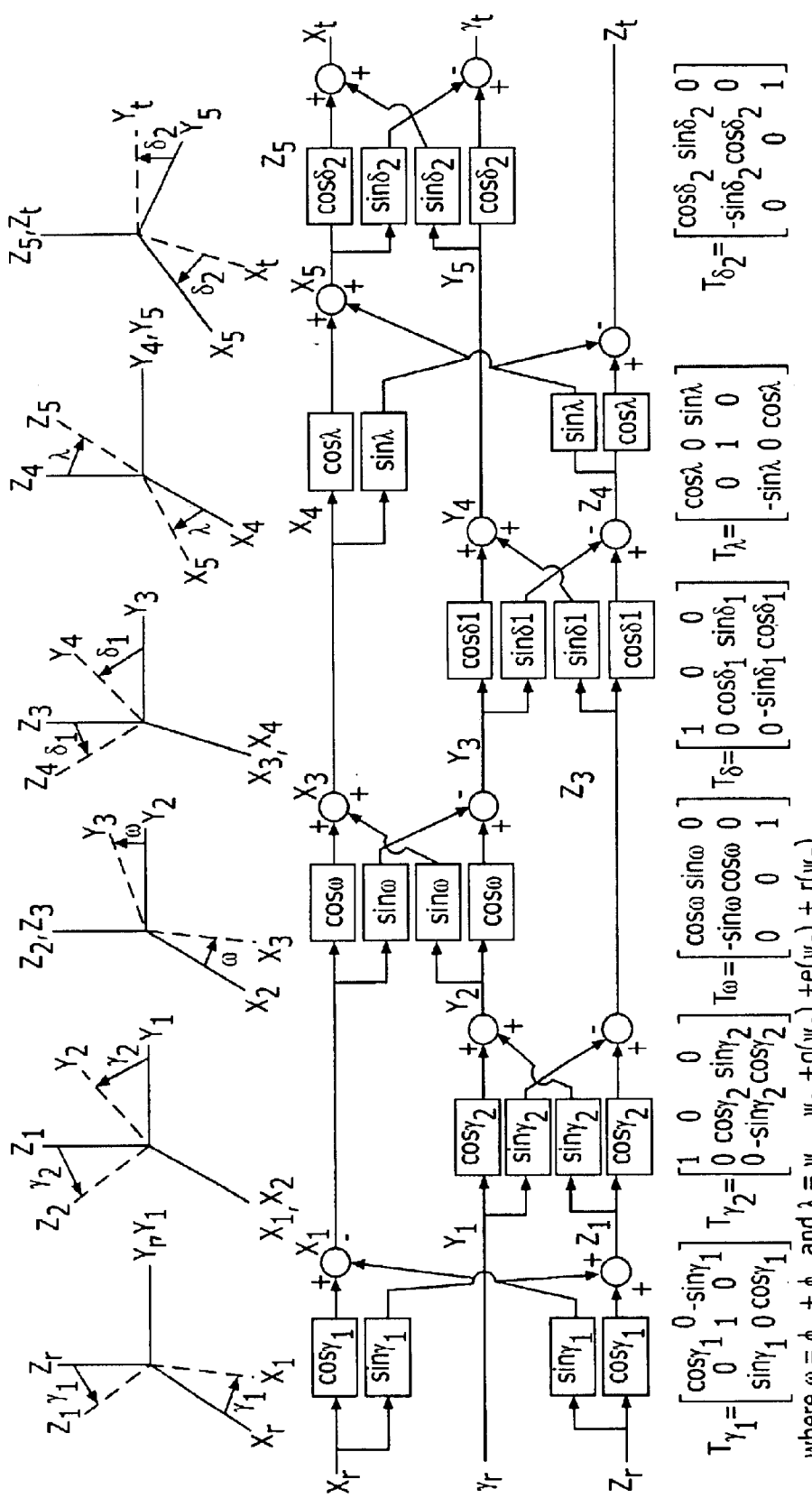
Figure 9:
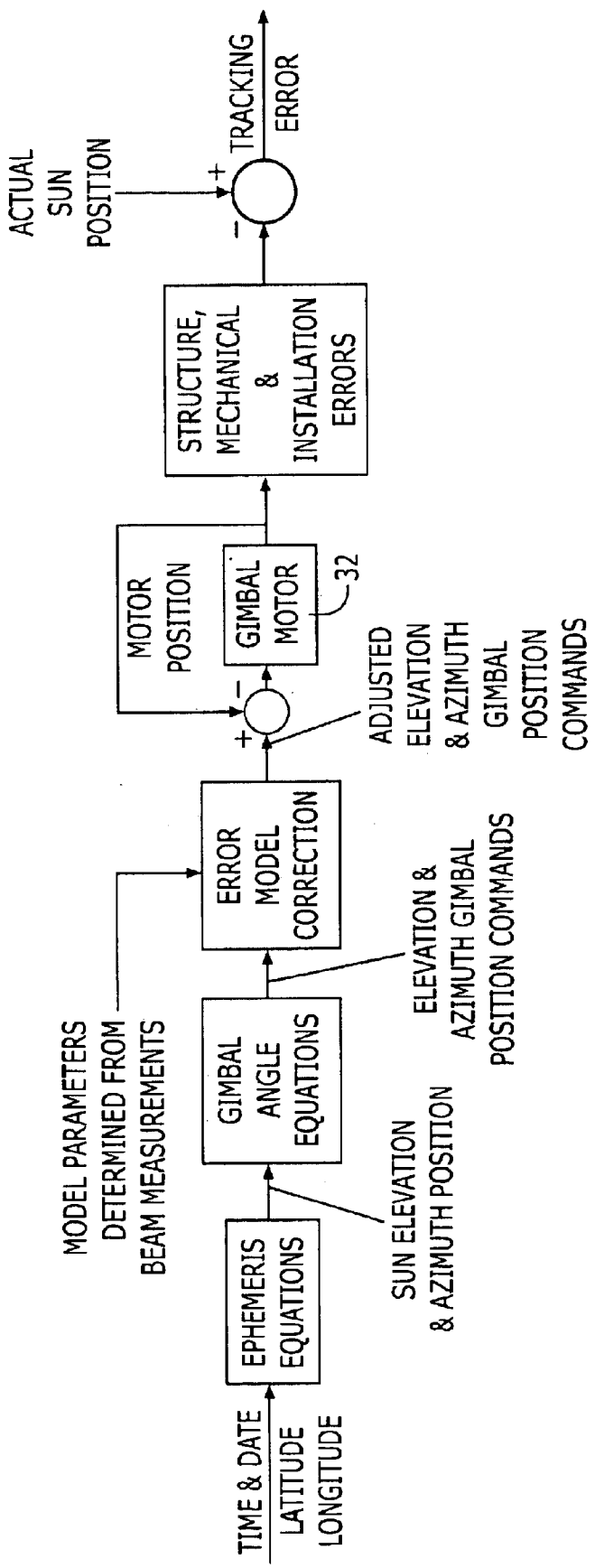
Figure 10:
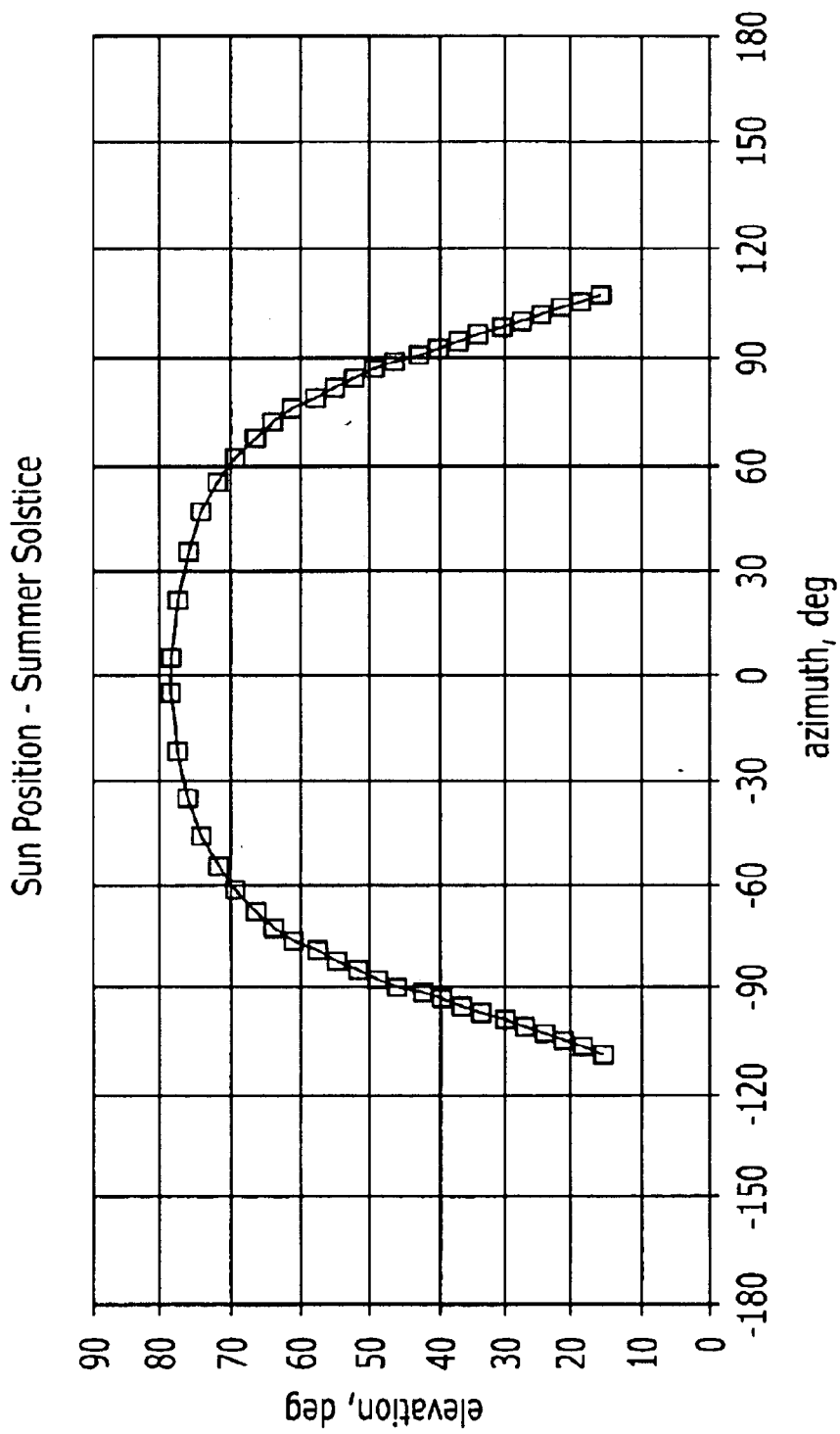
Figure 11:
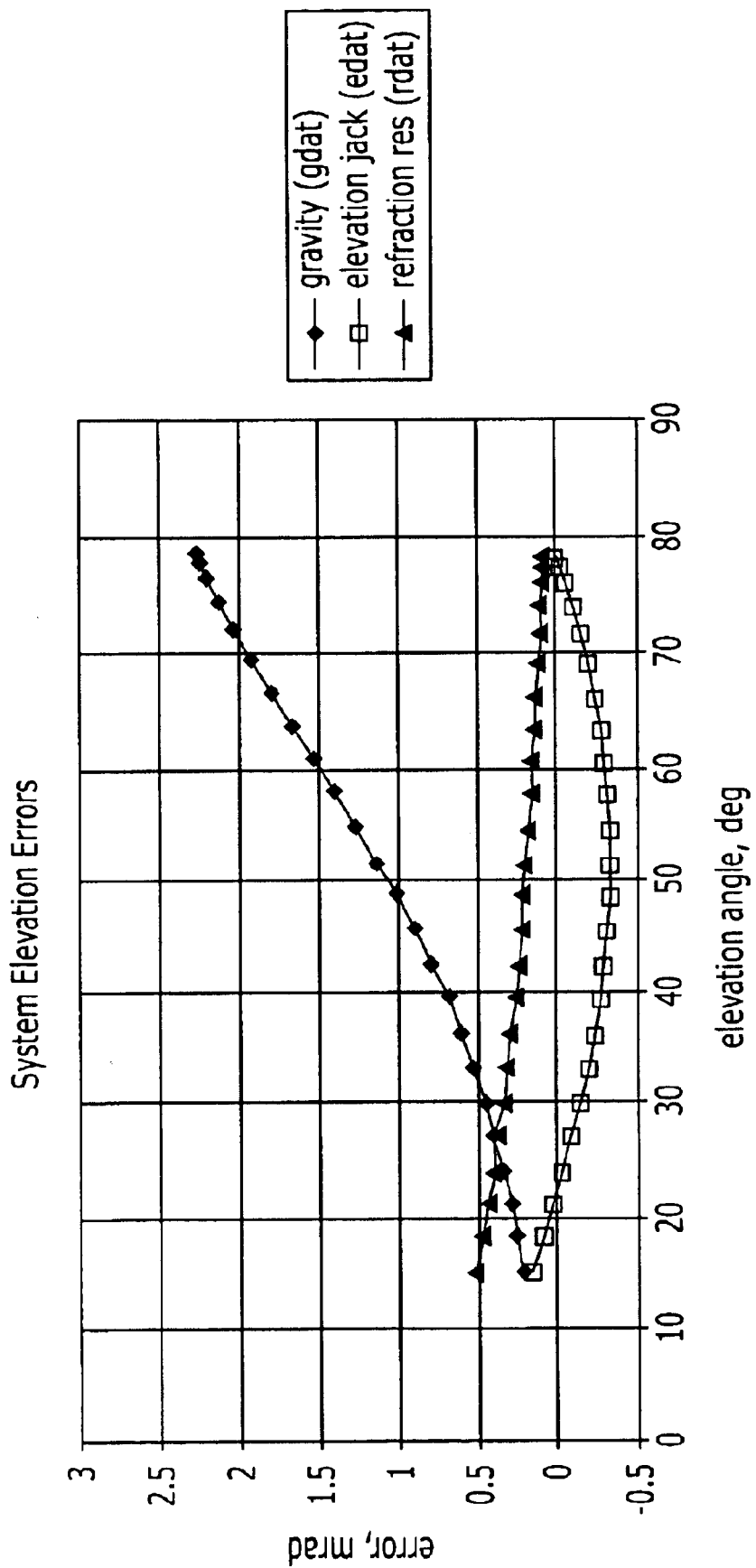
Figure 12:
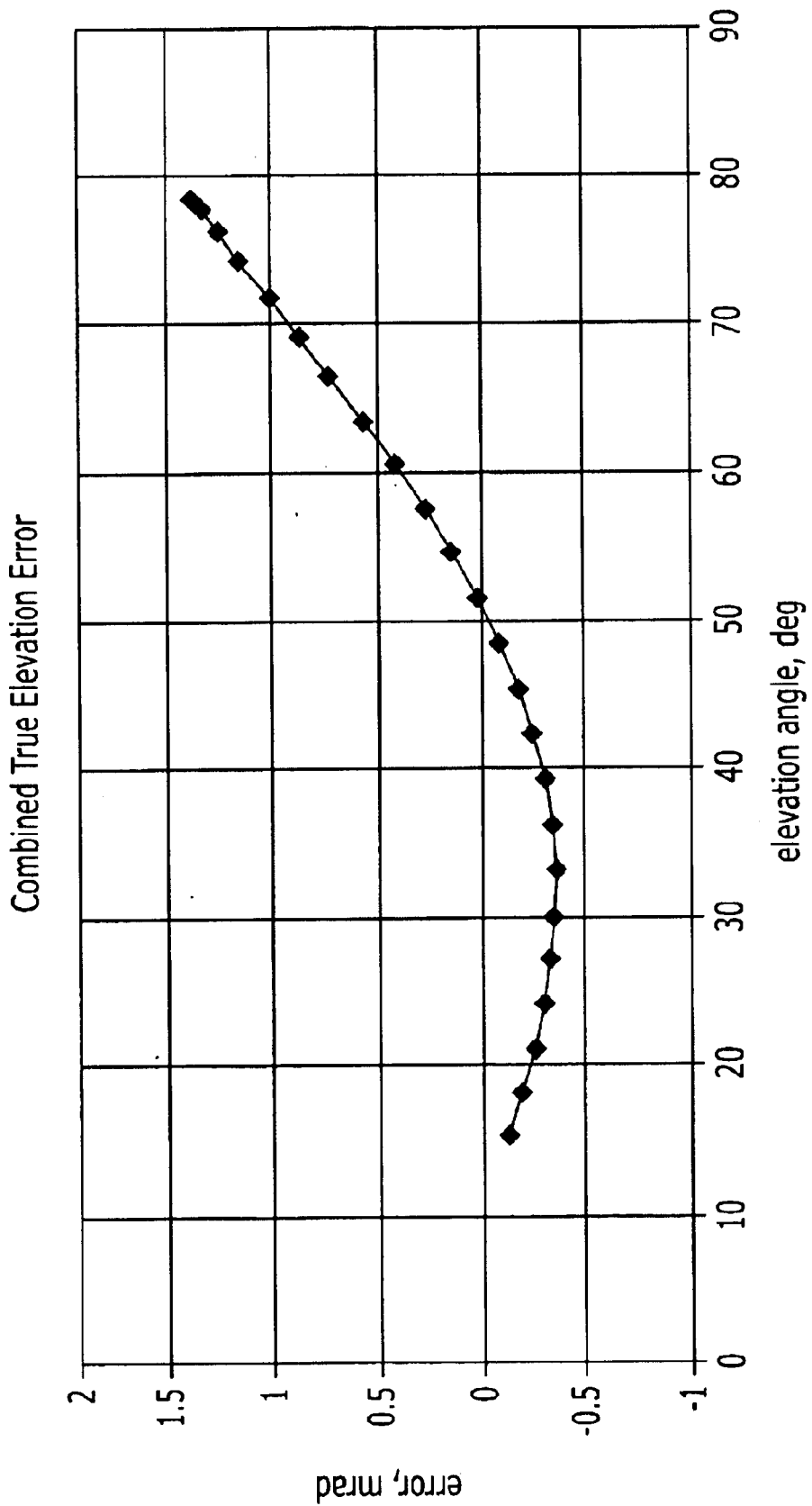
Figure 13:
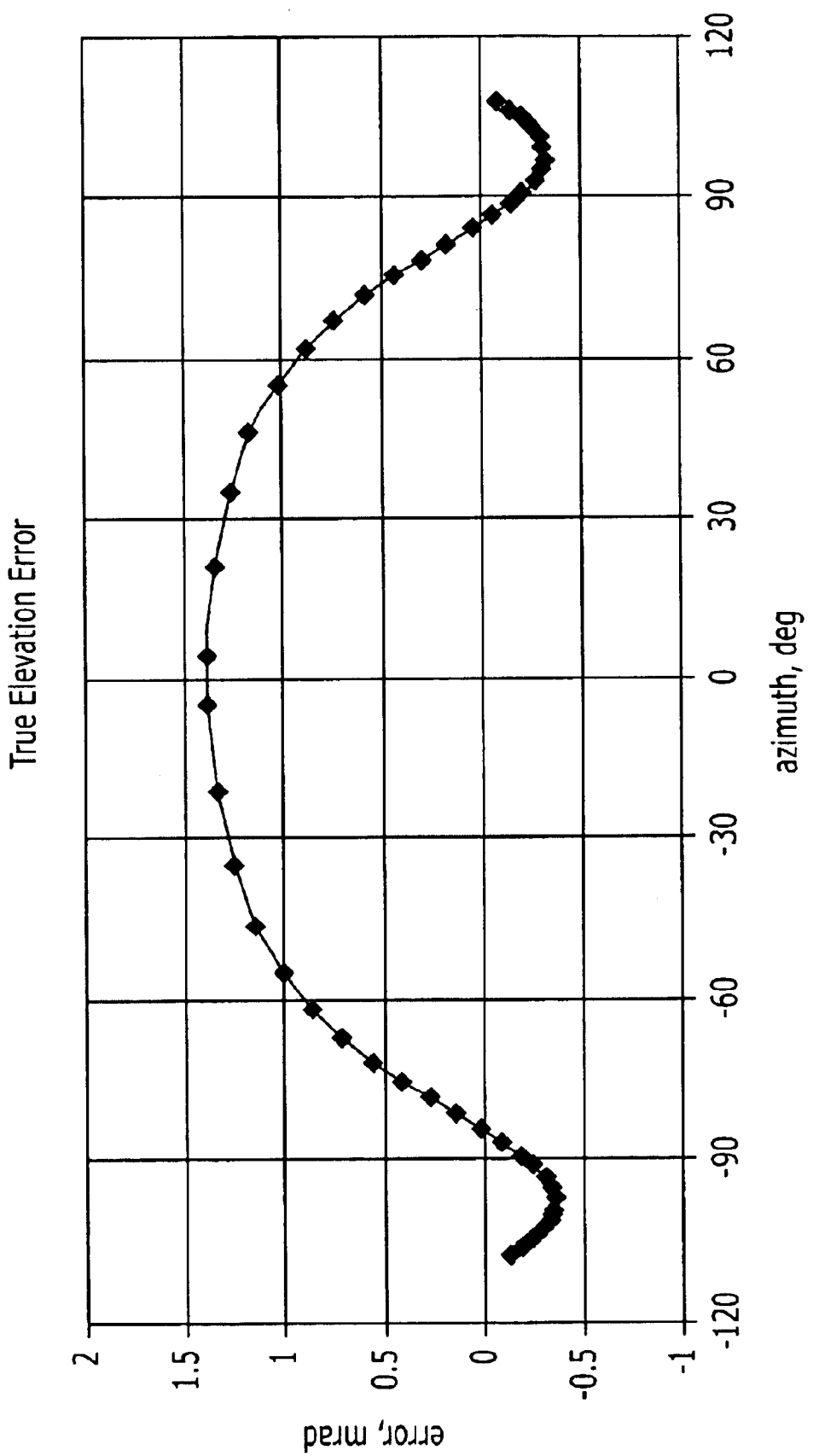
Figure 14:
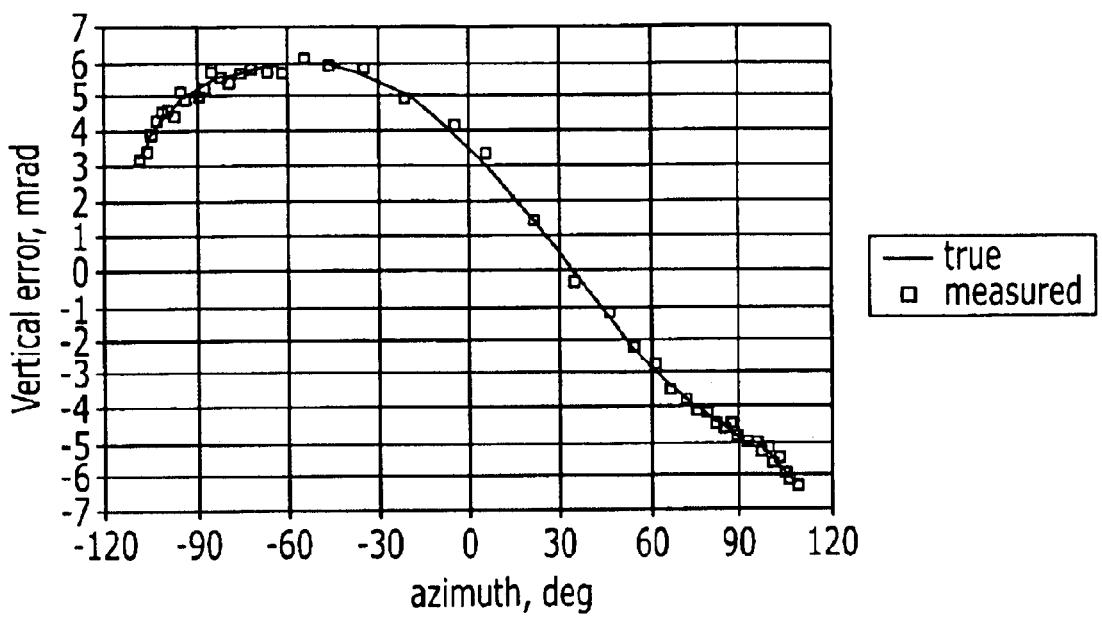
Figure 15:
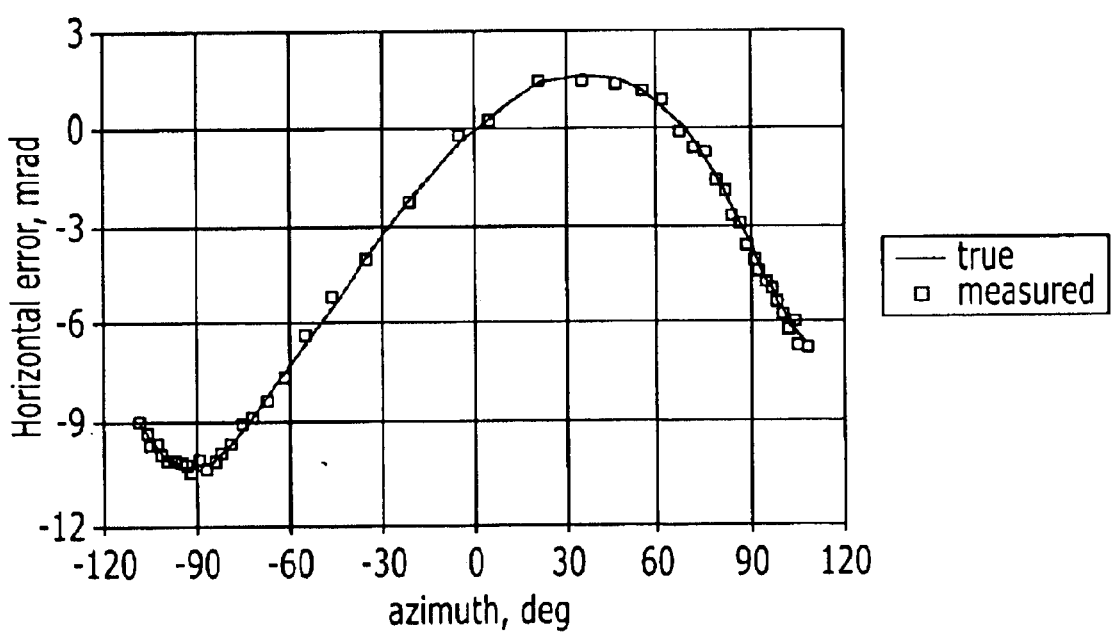
Figure 16A:
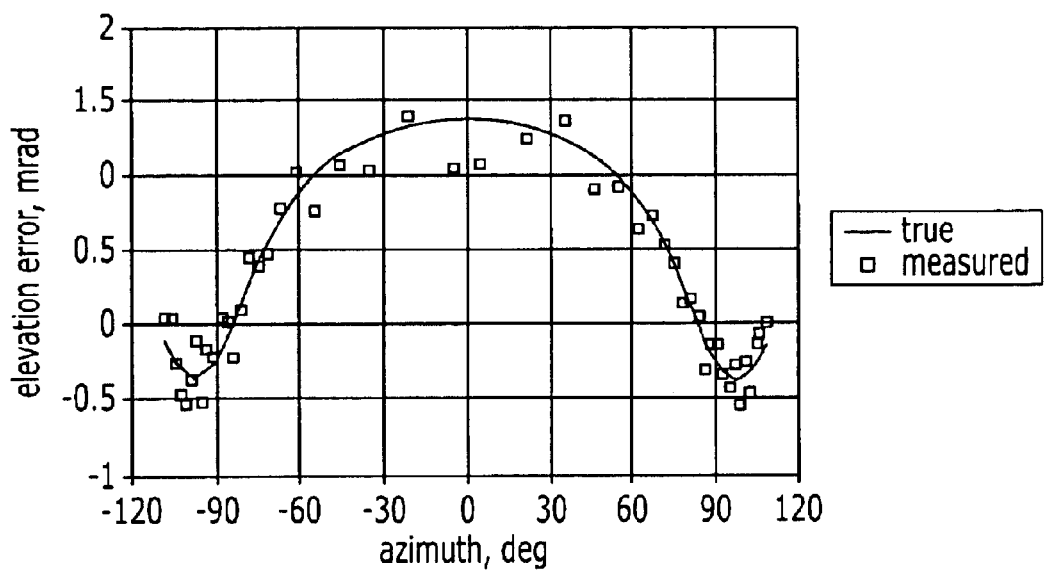
Figure 16B:
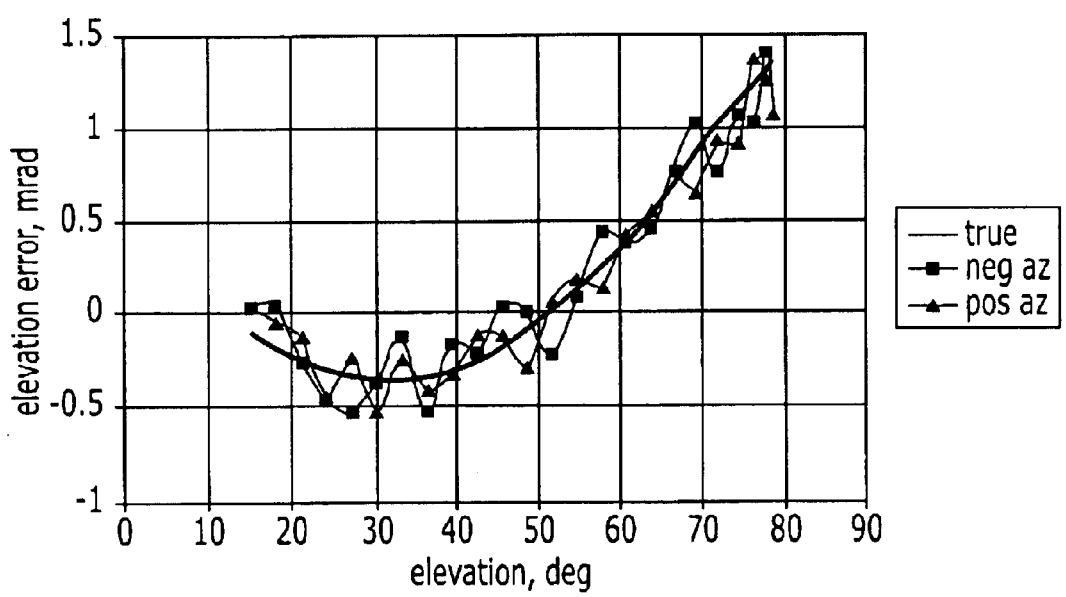
Figure 17:
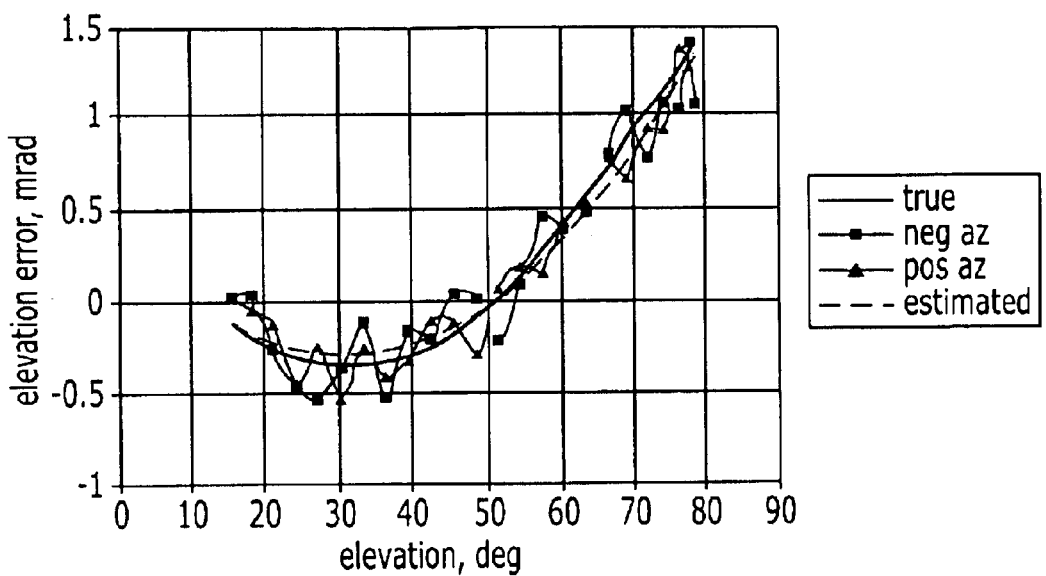
Figure 18A:
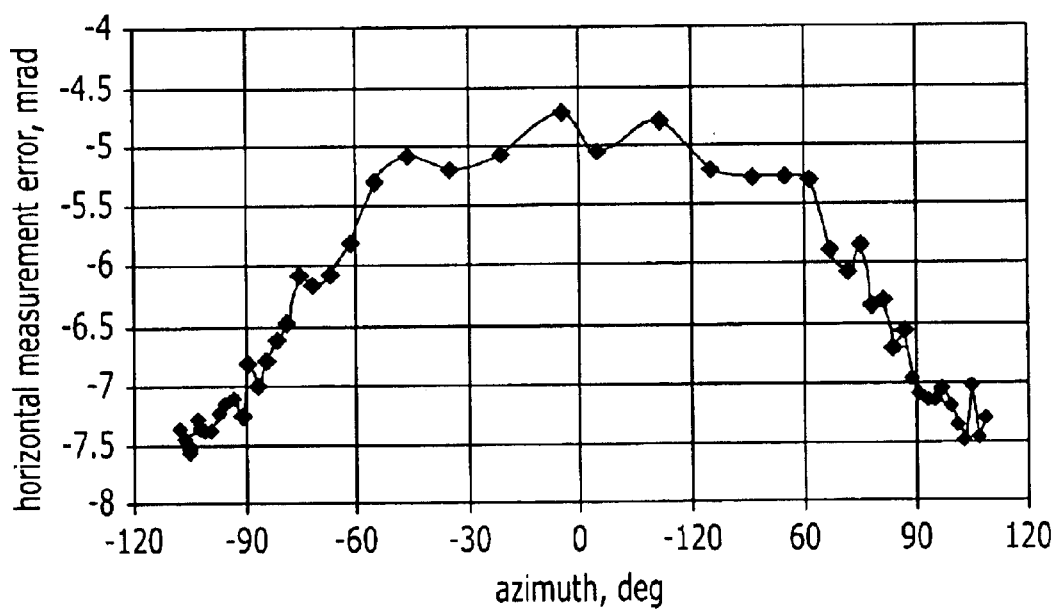
Figure 18B:
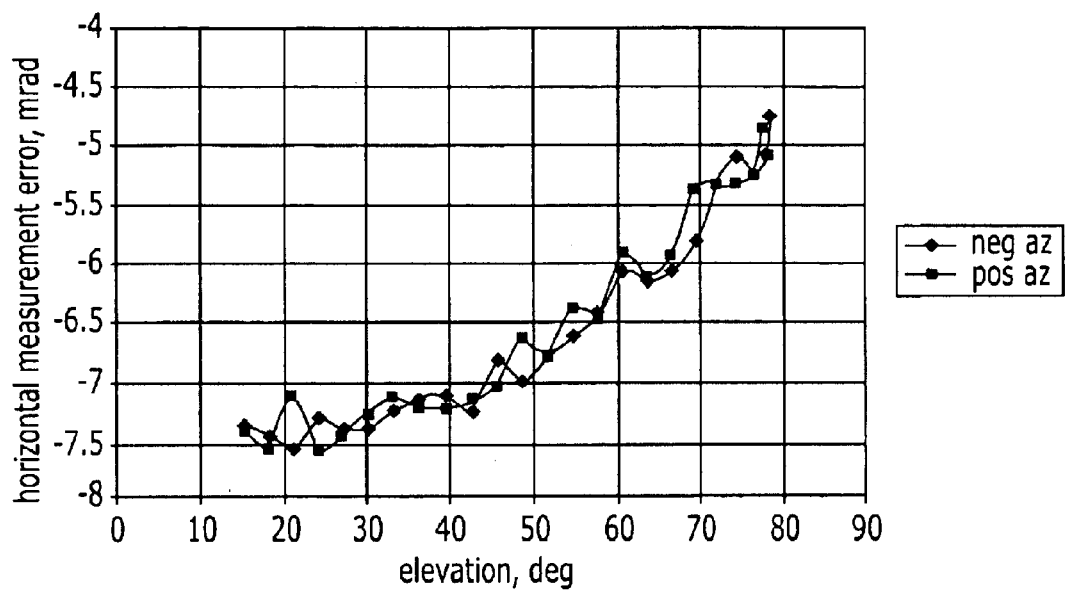
Figure 19A:
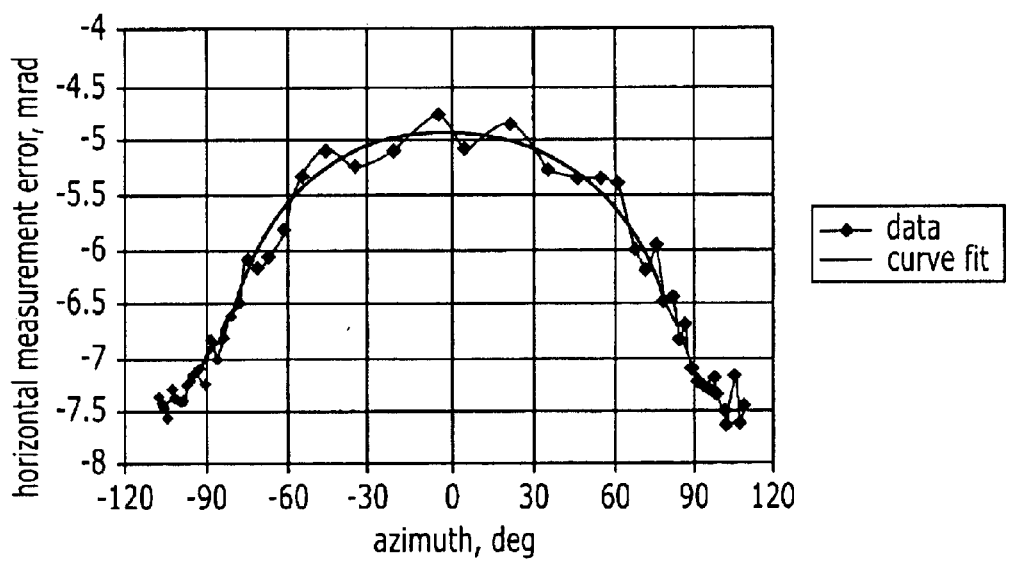
Figure 19B:
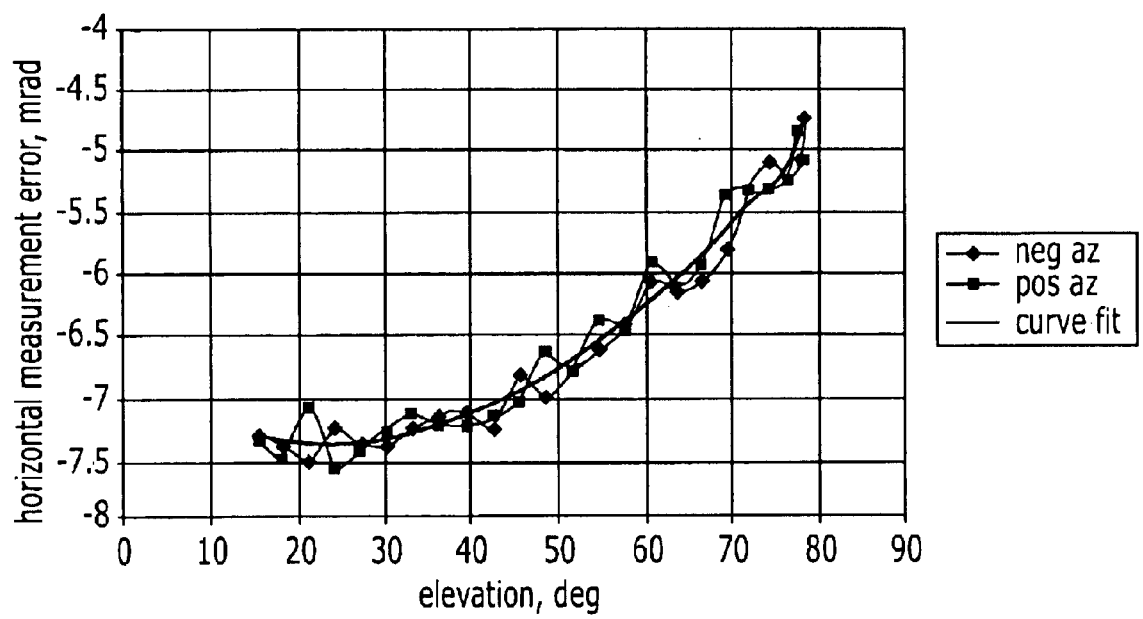
Figure 20A:
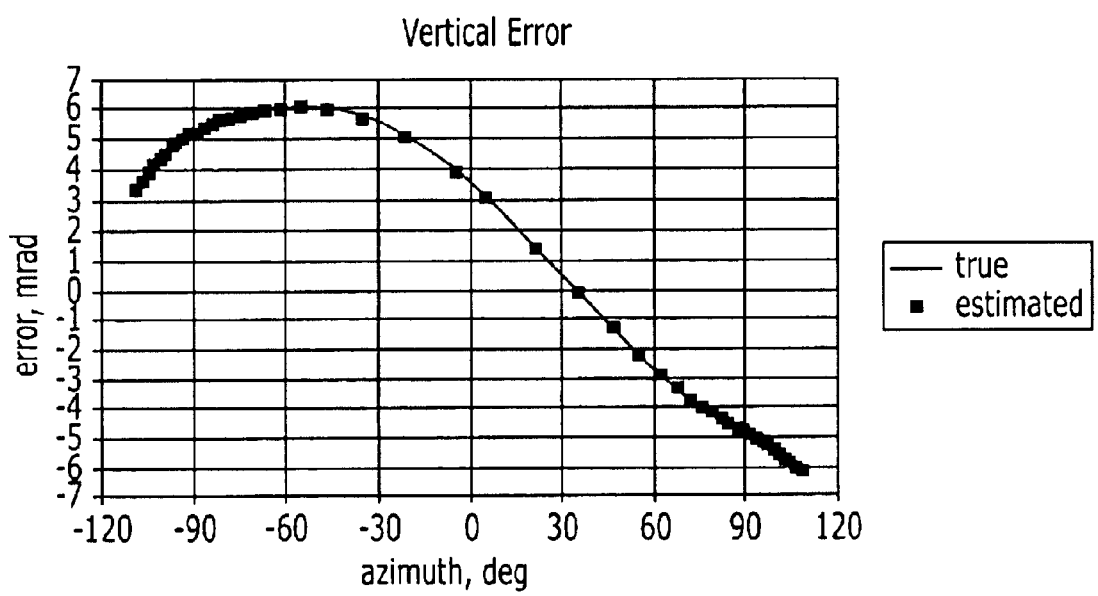
Figure 20B:
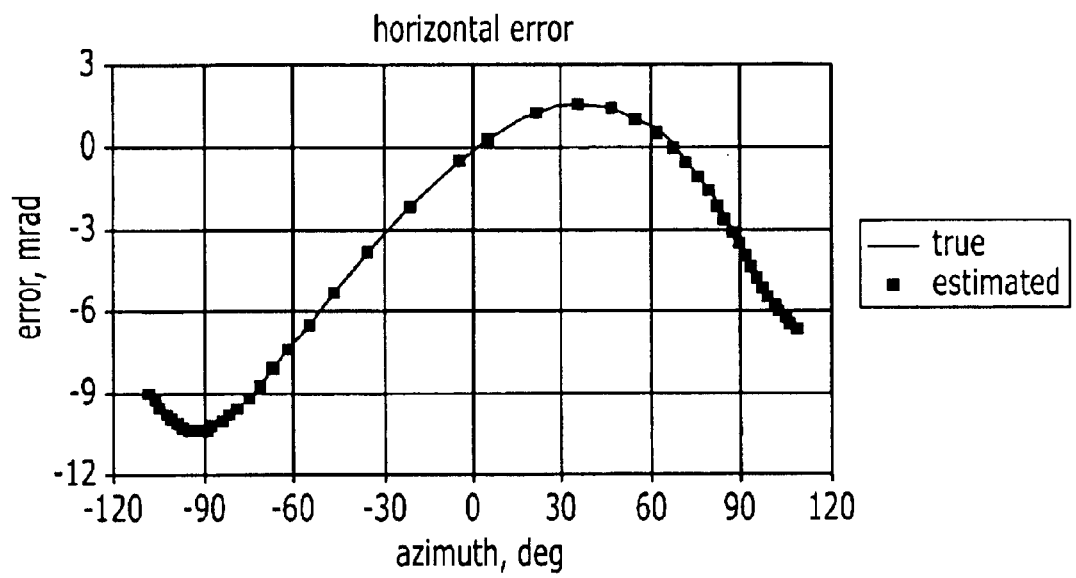
Figure 21A:
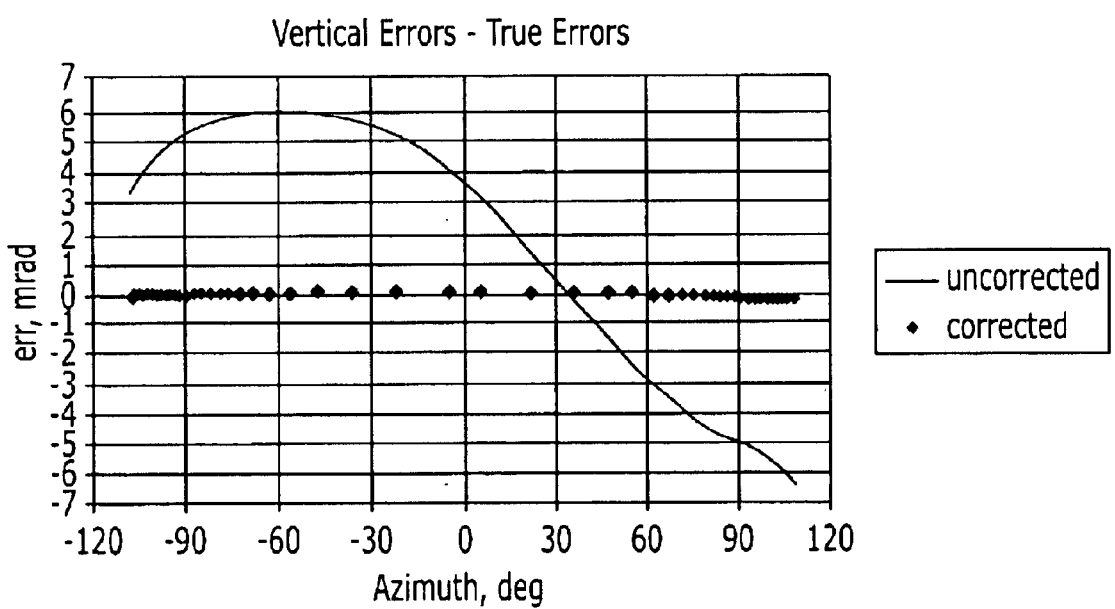
Figure 21B:
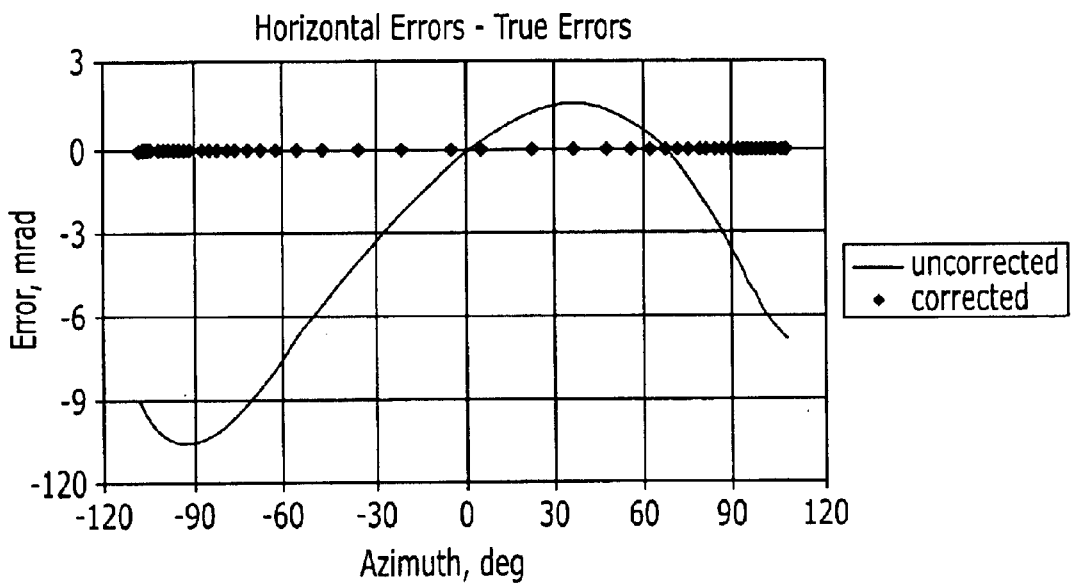
Figure 22A:
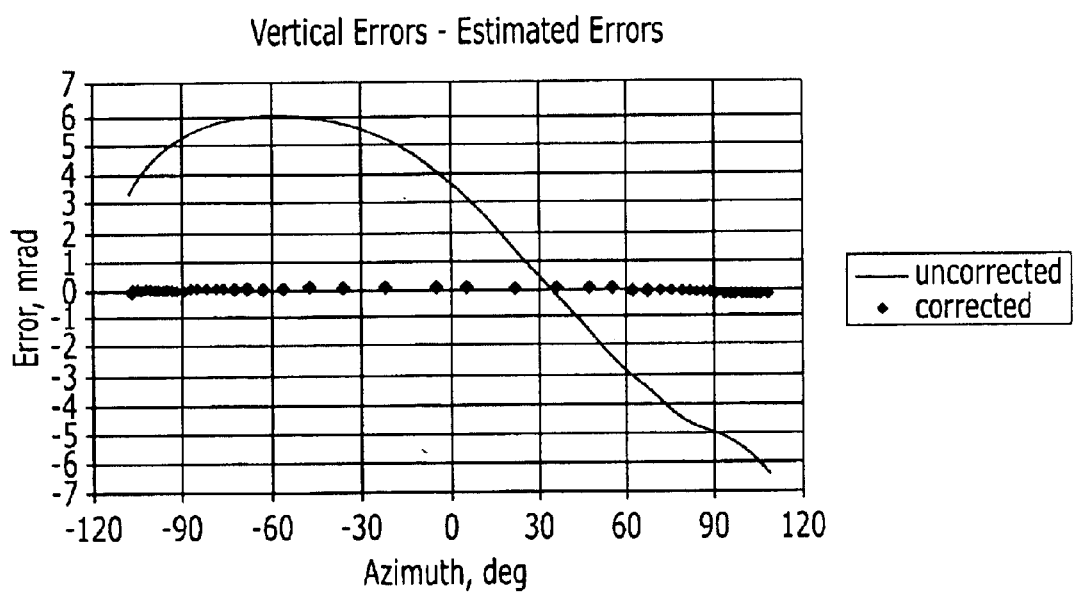
Figure 22B:
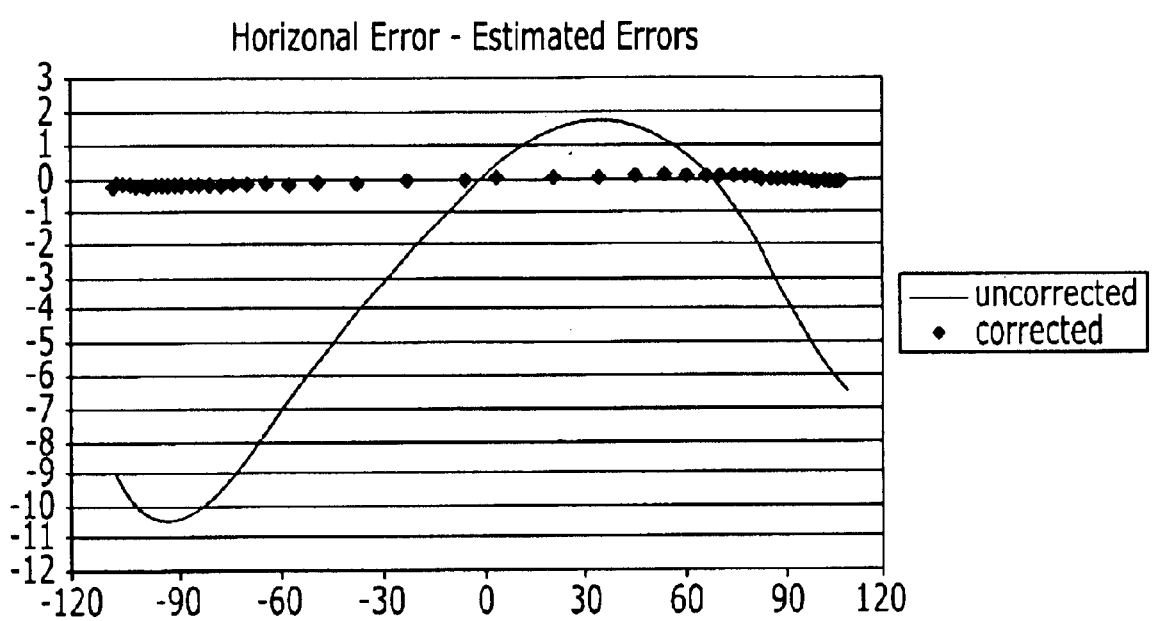

Having thus described the invention in general terms, reference will now be made to the accompanying drawings, which are not necessarily drawn to scale, and wherein:

FIGS. 1A and 1B are graphical representations of the elevation and azimuth track errors in degrees as a function of azimuth position in degrees from due south for a conventional solar concentrator;

FIG. 2 is a schematic perspective view of a solar concentrator according to one embodiment of the present invention;

FIG. 3 is a block diagram of a solar concentrator according to one embodiment of the present invention using a sun sensor;

FIG. 4 is an operational block diagram depicting the steps taken to obtain measurement data according to one embodiment of the present invention;

FIG. 5 is an operational block diagram of the steps undertaken to determine the track alignment parameters for a solar concentrator from a variety of error sources according to one embodiment of the present invention;

FIG. 6 is a pictorial representation of the relationship between the inertial reference system and the reference system of the solar concentrator;

FIG. 7 is a functional representation of the coordinate transformation between the reference and inertial coordinate systems to the solar concentrator;

FIG. 8 is the total transformation matrix from reference coordinates to the actual coordinates of the solar concentrator;

FIG. 9 is a operational block diagram of the steps undertaken to adjust the elevation and azimuth commands in order to compensate for the contributions of the variety of error sources according to one embodiment of the present invention;

FIG. 10 is a graphical representation of the elevation and azimuth angles of the sun throughout the day at summer solstice;

FIG. 11 is a graphical representation of the gravitational residue error g, the elevation transfer function error e and the error due to atmospheric refraction r as a function of elevation angle;

FIG. 12 is a graphical representation of the combined true elevation error $d\Psi_{tj}$ as a function of elevation angle;

FIG. 13 is a graphical representation of the true elevation error $d\Psi_{true}$ as a function of azimuth angle;

FIG. 14 is a graphical representation of the true and measured values of the vertical measurement error as a function of azimuth angle;

FIG. 15 is a graphical representation of the true and measured values of the horizontal measurement error as a function of azimuth angle;

FIGS. 16a and 16b are graphical representations of the true and measured values of the elevation error as a function of azimuth angle and elevation angle, respectively;

FIG. 17 is a graphical representation depicting the estimated elevation error as a function of elevation angle;

FIGS. 18a and 18b are graphical representations of the horizontal measurement errors as a function of azimuth angle and elevation angle, respectively;

FIGS. 19a and 19b are graphical representations of the curve fit representative of the horizontal measurement error as a function of azimuth angle and elevation angle, respectively;

FIGS. 20a and 20b are graphical representations of the true and estimated vertical and horizontal errors, respectively, as a function of azimuth angle;

FIGS. 21a and 21b are graphical representations of the corrected and uncorrected vertical and horizontal errors, respectively, as a function of azimuth angle; and FIGS. 22a and 22b are graphical representations of the corrected and uncorrected estimated vertical and horizontal errors, respectively, as a function of azimuth angle.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring now to FIG. 2, a solar concentrator 10 is depicted. As known to those skilled in the art, a solar concentrator includes a reflective surface 12, typically comprised of a plurality of reflective facets, mounted upon a support frame 14. The facets are typically mounted upon the support frame to define a generally parabolic or spherical surface. As such, solar energy incident upon the reflective surface will be concentrated to a focal point disposed upon a centerline 15 defined by the reflective surface. The solar concentrator therefore also includes a solar receiver 16, such as a Stirling engine, mounted at the focal point of the reflective surface for receiving the concentrated solar energy and for converting the solar energy into mechanical energy such as by means of the alternating compression and expansion of a confined gas. Although not illustrated, the Stirling engine is typically connected to an electrical power generator to convert the mechanical output from the Stirling engine into electrical energy.

The solar receiver 16 is mounted upon a support arm 18 which, in turn, is typically connected to the support frame 14 of the reflective surface 12. The solar concentrator 10 also includes a pedestal 20 mounted upon a foundation for supporting the support frame and the support arm as well as the reflective surface and the solar receiver carried thereby. The pedestal is adapted to permit movement of the solar concentrator in an azimuth rotational plane, typically from a generally east-facing position at sunrise to a generally west-facing position at sunset, and in an elevation rotational plane, typically from a horizon-facing position at sunrise to a maximum solar elevation-facing position in the middle of the day and back to a horizon-facing position at sunset, so as to track the sun. As such, the solar concentrator includes an azimuthal drive mechanism for providing the movement in the azimuth rotational plane and an elevational drive mechanism for providing the movement in the elevational rotational plane. In this regard, the elevational drive mechanism includes a linear actuator 22 for providing controlled movement in the elevational rotational plane. Further details of a solar concentrator are provided by U.S. Pat. No. 4,583,520 to John J. Dietrich, et al. and U.S. Pat. No. 5,758,938 to Carl E. Osterwisch, the contents of both of which are incorporated herein by reference in their entirety. While one embodiment of a solar concentrator is depicted in FIG. 2 and described above, the solar concentrator can be configured in many different manners, such as a heliostat or any other type of concentrating solar energy system known to those skilled in the art.

According to the present invention, an apparatus, method, control system and computer program product are provided for controllably positioning the solar concentrator 10 to reduce, if not eliminate, any offset between the centerline 15 defined by the reflective surface 12 of the solar concentrator and the sun reference vector, that is, the vector representing the direction in which the sun rays are traveling upon incidence with the solar concentrator. As illustrated in FIG. 3, the apparatus 24 of the present invention includes three primary components, namely, a measurement system 26, a control system 27 including a processing element 28 and a positioning mechanism 30.

As described in more detail below, the measurement system 26 determines the vertical error and the horizontal error between the centerline 15 defined by the reflective surface 12 of the solar concentrator 10 and the sun reference vector. In other words, the measurement system determines the misalignment of the solar concentrator which is due to the collective contribution of a plurality of different types of errors. The processing element 28 determines respective errors generated by each of the different error sources that contribute to the vertical error and/or the elevation error. According to the present invention, the plurality of error sources include at least one of a gravitation residue error $g(\Psi)$, an elevation transfer function error $e(\Psi)$, and an error $r(\Psi)$ due to atmospheric refraction. The processing element then determines the elevation command and the azimuth command that will compensate for the vertical error and the horizontal error based at least in part upon the respective errors generated by the plurality of error sources. Finally, the positioning mechanism 30 positions the solar concentrator based upon the elevation command and the azimuth command in order to compensate for the vertical error and the horizontal error. As such, the centerline defined by the reflective surface of the solar concentrator will be in alignment with the sun reference vector, thereby improving the efficiency with which the solar concentrator collects solar energy.

While the solar concentrator 10 can be positioned by a variety of different mechanisms without departing from the spirit and scope of the present invention, the positioning mechanism 30 typically includes a motor 32 and the azimuthal and elevational drive mechanisms 34, 36 in order to appropriately position the solar concentrator in both the azimuth rotational plane and the elevational rotational plane. In this regard, the elevational drive mechanism includes, among other components, the linear actuator 22 that is responsive to the motor.

Various types of measurement systems 26 can be utilized to determine the vertical and horizontal errors between the centerline 15 defined by the reflective surface 12 of the solar concentrator 10 and the sun reference vector, i.e., the line of sight to the sun. In one embodiment, the measurement system comprises a sun sensor mounted upon the solar concentrator and aligned along the centerline defined by the reflective surface in order to determine the vertical error and the horizontal error between the centerline defined by the reflective surface and the sun reference vector.

In this regard, FIG. 4 depicts the operational steps that are performed in order to determine the vertical and horizontal errors, collectively termed the tracking error, of the sun sensor. In this regard, the sun elevation and azimuth position is determined by a plurality of the ephemeris equations based upon the time and date and the latitude and longitude of the solar concentrator 10. Based upon the calculated position of the sun, the solar concentrator is commanded to a position in which the centerline 15 defined by the reflective surface 12 is pointed toward the current position of the sun as known to those skilled in the art. Although the motor 32 and the associated azimuthal and elevational drive mechanisms 34, 36 drive the solar concentrator to the designated position, various error sources cause the solar concentrator to actually be misaligned somewhat relative to the sun reference vector. The sun sensor detects this misalignment and determines the tracking error which includes both the vertical error and the horizontal error between the centerline defined by the reflective surface and the sun reference vector. The foregoing process is typically repeated at a plurality of times throughout the day, such as at periodic intervals of 15 to 30 minutes in one embodiment.

As an alternative to a sun sensor, the measurement system 26 can include a digital image radiometer as described by U.S. Pat. No. 5,493,392 to James V. Blackmon, et al., the contents of which are also incorporated herein in their entirety. Like the sun sensor, the digital image radiometer is mounted upon the solar concentrator 10 and determines the tracking error, comprised of the vertical and horizontal errors, between the centerline 15 defined by the reflective surface 12 of the solar concentrator and the sun reference vector.

In those embodiments in which the solar concentrator 10 is a Stirling dish, the solar receiver 16 is divided into four quadrants. If the solar flux is not evenly distributed over the solar receiver, each quadrant will have a different gas temperature. As such, the measurement system 26 can include a controller associated with the Stirling dish for commanding the Stirling dish to point toward the calculated position of the sun as described above. The gas temperature is then measured for each quadrant and the maximum temperature difference between the gas temperatures of the four quadrants is then determined. The controller then commands the Stirling dish to move slightly up and then down in the elevation rotational plane and east and west in the azimuth rotational plane with the temperature difference between the gas temperatures of each quadrant determined in each position of the Stirling dish. This perturbation of the position of the Stirling dish is repeated until the lowest gas temperature difference is determined. The position of the Stirling dish at which the gas temperature difference is the lowest is determined to be the optimal position at which the centerline 15 of the Sterling dish is actually pointed at the sun. As such, the vertical and horizontal errors are determined by the controller to be the vertical and horizontal differences between the optimal position of the Stirling dish at which the Stirling dish is actually pointed at the sun and the original position to which the Stirling dish was initially commanded.

Similarly, the measurement system 26 can be a controller that determines the power level of the solar concentrator 10. In this regard, the output power and, more particularly, the power level, of the solar concentrator is a good measure of the relative alignment of the solar concentrator with the sun reference vector. The power level is defined by the output power provided by the solar concentrator divided by the sun insulation. As described above, the solar concentrator is commanded to point at the calculated position of the sun based upon the current time and date. The position to which the solar concentrator is pointed is then perturbed alternately in the azimuth rotational plane and the elevation rotational plane. The power level of the output power provided by the solar concentrator is determined by the controller in each position. The position at which the solar concentrator provides the maximum power level is determined to be the position at which the solar concentrator is actually aligned with the sun reference vector. As such, the controller determines the tracking error, i.e., the vertical and horizontal errors, between the original position to which the solar concentrator was commanded and the aligned position having the maximum power level. In each of these instances, the measurement system preferably repeats the process of determining the horizontal and vertical errors between the nominal position to which the solar concentrator is initially commanded and the aligned position at which the centerline 15 defined by the reflective surface 12 of the solar concentrator is actually pointed at the sun reference vector.

Thereafter, the control system 27 of the present invention which includes the processing element 28 utilizes the measurement data, i.e., the vertical and horizontal errors, to estimate the error parameters as illustrated schematically in FIG. 5. In an open loop tracking control system such as the control system of the present invention, there are many error sources that can introduce errors and adversely affect the actual position that the solar concentrator assumes in response to the elevation and azimuth position commands. By determining the contribution of each of these error sources, the control system of the present invention permits these errors to be corrected as shown in FIG. 9 such that the solar concentrator is pointed directly at the sun and the efficiency with which solar energy is collected is increased. Advantageously, the method, apparatus, control system and computer program product of the present invention permit more and different to be determined and corrected than conventional open loop tracking control systems.

The error sources that are corrected by the various embodiments of the present invention include the gravitational residue error $g(\Psi)$. As described above, the solar concentrator 10 consists of two major components, namely, the mirror reflectivity assembly and the power conversion unit (PCU). These two components are heavy and are located at the opposite end of the structure in order to balance the loads on the elevation and azimuth drives. Because of the geometry, the gravitational weight is not balanced, therefore as the elevation angle changes, the gravitational moment about the pivot point changes. As the gravitational moment changes, the structural bending introduced by the gravitational moment changes. Although a nominal value of the gravity bending is added to the gimbal position command to provide some compensation for the structural bending, there generally remains a gravitational residue error occasioned by structural bending that has gone uncompensated because of the difference in the structural strength from one system to the next.

Another error source is the elevation transfer function error $e(\Psi)$. The elevation actuator is a linear actuator. Because of the geometry with respect to the elevation pivot point, however, the transfer function from elevation angle to actuator movement is a nonlinear function. The nonlinear transfer function is referenced to a particular geometric position of the actuator. During installation the actuator is set at the reference position. There is some error in finding this position, however, which results in an error between the commanded elevation angle and the actual elevation angle.

Another error source relates to atmospheric refraction $r(\Psi)$. The sun's rays bend toward the earth's surface as they enter the atmosphere. The amount of bending depends upon the elevation angle of the sun, the atmospheric pressure along the path of the sun's rays, and the air temperature along the path of the sun. There are atmospheric refraction models to correct the bending of the sun's rays and these can be incorporated into the commanded elevation angle. However, there remains some error residual that serves as this error source.

Azimuth rotational tilt $\gamma_1$ and $\gamma_2$ is another error source. There are a number of error sources that can make the azimuth rotational plane not perpendicular to the local vertical. For example, not installing the pedestal exactly vertical is the most common source of this error, but other causes could be that the azimuth drive interface with the pedestal is at an angle due to machining tolerances, the foundation could settle after installation, the azimuth drive bearing could be at an angle to the vertical axis due to machining tolerance, etc.

Another error source is the elevation rotational tilt $\Phi e$ and $\delta_1$. There are also a number of error sources that can result in the elevation rotational plane not being the same as the local vertical plane. The azimuth position of the concentrator must be referenced to the local South position. If it is not, the elevation rotational plane at a zero elevation angle is not aligned with the command plane. Another contributor to this error is if the elevation pivot point is not aligned to the azimuth rotational plane due to structural/machining tolerance. Therefore the vertical axis of the elevation plane is not aligned to the vertical axis of the local vertical plane.

Reflective surface non-orthogonality $\delta_2$ is another error source. The centerline defined by the reflective surface may not be parallel to the centerline of the drive system. This type of error could result from the reflective surface support structural tolerance or misalignment of the mirrors. The reflective surface is made up of 82 or more mirror segments. Each mirror facet must be aligned at specific cant angles. The Digital Image Radiometer described by U.S. Pat. No. 4,564,275 can be used to align the mirror facets. If this system is not aligned exactly to the concentrator drive system coordinate system, a non-orthogonality error will be introduced. Also the Digital Image Radiometer can only align the mirror centerline to a specified accuracy. Since each mirror has some randomness associated with it, the effective centerline of the reflective surface will be misaligned or non-orthogonal to the drive coordinate system.

One additional error source is due to the elevation reference position errors $\Psi_e$. The elevation angle of the sun is calculated with respect to the local horizontal plane. If the actual elevation angle of the solar concentrator is not determined with respect to this local horizontal plane, an elevation reference track error occurs.

There are several coordinate systems used in the tracking system as illustrated in FIG. 6. The sun position is calculated in an inertial reference system $(X_r, Y_r, Z_r)$ where the x-axis is pointing South, the y-axis is pointing East, and the z-axis is the local vertical. The second coordinate system is the tracker system $(X_t, Y_t, Z_t)$ where $X_t$ is aligned with the normal of the reflective surface, $Z_t$ is in the vertical plane of the solar concentrator, and $Y_t$ and $Z_t$ are in the plane of the aperture surface of the solar concentrator.

The sun position is defined in an inertial reference system (r) by the two angles $\Phi r$ and $\Psi r$. The direction cosines of the sun reference vector are:

$$\begin{bmatrix} x_r \\ y_r \\ z_r \end{bmatrix} = \begin{bmatrix} \cos\psi_r \cos\phi_r \\ \cos\psi_r \sin\phi_r \\ \sin\psi_r \end{bmatrix} \quad (1)$$

where $\Phi_r$=required azimuth angle to point at the sun $\Psi_r$=required elevation angle to point at the sun The function of the control system is to point the centerline of the reflective surface (e.g., the $X_t$ axis) at the sun. This is accomplished by calculating azimuth and elevation command angles that will place the centerline of the reflective surface pointing at the sun as shown in FIG. 6. The centerline of the reflective surface or command vector would then be co-linear with the sun vector, Equation (1). Thus, the command vector would be:

$$\begin{bmatrix} x_c \\ y_c \\ z_c \end{bmatrix} = \begin{bmatrix} \cos\psi_c \cos\phi_c \\ \cos\psi_c \sin\phi_c \\ \sin\psi_c \end{bmatrix} \quad (2)$$

A functional representation of the coordinate transformation between the reference vector (r) and the vector associated with the solar concentrator, i.e., the tracker vector (t), is shown in FIG. 7 and can be expressed as follows:

$$\begin{bmatrix} x_t \\ y_t \\ z_t \end{bmatrix} = T_{\delta_2} T_\lambda T_{\delta_1} T_\omega T_{\gamma_2} T_{\gamma_1} \begin{bmatrix} x_r \\ y_r \\ z_r \end{bmatrix} \quad (3)$$

wherein the reference vector points at the sun.

The vector ($X_t$, $Y_t$, $Z_t$) defines the sun vector in the reference system of the solar concentrator. For a measurement system that includes a sun sensor mounted on the tracker and aligned with the centerline of the reflective surface, the sun sensor errors would be:

$$\text{Vertical Error} = VE = \tan^{-1}\left[\frac{z_t}{x_t}\right] = \tan^{-1}\left[\frac{z_e}{x_e}\right] \quad (4)$$

$$\text{Horizontal Error} = HE = \tan^{-1}\left[\frac{y_t}{x_t}\right] = \tan^{-1}\left[\frac{y_e}{x_e}\right] \quad (5)$$

wherein the subscript "t" has been changed to "e" to denote the sun sensor error component.

As described above, the control system of the present invention then determines the contribution of each error source. By way of explanation, the derivation of the various equations that are utilized by the control system of one embodiment to determine the relative contribution of each of the error sources will hereinafter be described. The sun tracking measurement error transfer function relating the measurement errors to the systematic error sources are obtained from Equation (3). The transformations shown in FIG. 7 are substituted into this equation with the final result depicted in FIG. 8. The resulting equations are then substituted into Equations (4) and (5).

These equations are very complex and a complete analytical solution is virtually impossible. However, by application of small angle approximations to the error sources, these equations can be re-cast in a form that is solvable analytically for the approximate pertinent error sources. Specifically, small angle approximations applied to the transformation in FIG. 8, under the assumption that these errors are indeed small, are:

$\cos \alpha \approx 1$ $\sin \alpha \approx \alpha$ $\sin \alpha \sin \beta \approx 0$ $\sin \alpha \sin \beta \sin \xi \approx 0$ \quad (6)

to determine the following measurement error transfer functions:

$$X_t = X_r[\cos\lambda\cos\omega + \sin\lambda\sin\gamma_1 + \sin\lambda\sin\omega\sin\delta_1 - \sin\delta_2\sin\omega] + \quad (7)$$
$$Y_r[\cos\lambda\sin\omega - \sin\lambda\cos\omega\sin\delta_1 - \sin\lambda\sin\gamma_2 + \cos\omega\sin\delta_2] +$$
$$Z_r[\sin\lambda + \cos\lambda\sin\omega\sin\gamma_2 - \cos\lambda\cos\omega\sin\gamma_1]$$

$$Y_t = X_r[-\sin\omega - \sin\delta_2\cos\lambda\cos\omega] + \quad (8)$$
$$Y_r[\cos\omega - \sin\delta_2\cos\lambda\sin\omega] +$$
$$Z_r[\cos\omega\sin\gamma_2 + \sin\delta_1 + \sin\omega\sin\gamma_1 - \sin\delta_2\sin\lambda]$$

$$Z_t = X_r[\cos\lambda\sin\omega\sin\delta_1 + \cos\lambda\sin\gamma_1 - \sin\lambda\cos\omega] + \quad (9)$$
$$Y_r[-\cos\lambda\cos\omega\sin\delta_1 - \cos\lambda\sin\gamma_2 - \sin\lambda\sin\omega] +$$
$$Z_r[\cos\lambda + \sin\lambda\cos\omega\sin\gamma_1 - \sin\lambda\sin\omega\sin\gamma_2]$$

wherein $\alpha$, $\beta$ and $\xi$ denote arbitrary small angles measured in radians. Further, since $\omega=\Phi_c+\Phi_e$ and $\lambda=\Psi_c-\Psi_e+g(\Psi)=e(\Psi)+r(\Psi)=\Psi_c+d\Psi$ (see FIG. 7), the following identities result by selectively applying the above small angle approximations.

$\cos \omega = \cos(\Phi_c+\Phi_e) = \cos \Phi_c \cos \Phi_e - \sin \Phi_c \sin \Phi_e = \cos \Phi_c - \sin \Phi_c \sin \Phi_e$ $\sin \omega = \sin(\Phi_c+\Phi_e) = \sin(\cos \Phi_c \cos \Phi_e + \sin \Phi_e \cos \Phi_c) = \sin \Phi_c + \sin \Phi_e \cos \Phi_c$ $\cos \lambda = \cos(\Psi_c+d\Psi) = \cos \Psi_c \cos d\Psi - \sin \Psi_c \sin d\Psi = \cos \Psi_c - \sin \Psi_c \sin d\Psi$ $\sin \lambda = \sin(\Psi_c+d\Psi) = \sin \Psi_c \cos d\Psi + \sin d\Psi \cos \Psi_c = \sin \Psi_c + \sin d\Psi \cos \Psi_c$ \quad (10)

For $\alpha$ denoting a small angle and applying Equations (6) and (10), it is noted that:

$\sin \alpha \cos \omega = \sin \alpha(\cos \Phi_c - \sin \Phi_c \sin \Phi_e) = \sin \alpha \cos \Phi_c$ $\sin \alpha \sin \omega = \sin \alpha(\sin \Phi_c + \sin \Phi_e \cos \Phi_c) = \sin \alpha \sin \Phi_c$ $\sin \alpha \cos \lambda = \sin \alpha(\cos \Psi_c - \sin \Psi_c \sin d\Psi) = \sin \alpha \cos \Psi_c$ $\sin \alpha \sin \lambda = \sin \alpha(\sin \Psi_c + \sin d\Psi \cos \Psi_c) = \sin \alpha \sin \Psi_c$ \quad (11)

The command angles ($\Phi_c$ and $\Psi_c$) are computed using a sun model that is assumed to have zero error relative to the real sun, e.g., zero modeling error. The corresponding reference coordinates ($X_r$, $Y_r$ and $Z_r$), are defined with respect to the command angles as follows:

$$\begin{bmatrix} X_r \\ Y_r \\ Z_r \end{bmatrix} = \begin{bmatrix} \cos\Phi_c\cos\Psi_c \\ \sin\Phi_c\cos\Psi_c \\ \sin\Psi_c \end{bmatrix} \quad (12)$$

By substituting Equations (6) and (10–12) in Equation (7) for $X_r$, the expression for $X_t$ reduces to:

$X_t=1$ \quad (13)

Similarly, Equations (8) and (9) for $Y_t$ and $Z_t$, respectively reduce to the following:

$Y_t=\sin \Psi_c \sin \Phi_c \sin \gamma_1+\sin \Psi_c \cos \Phi_c \sin \gamma_2-\cos \Psi_c \sin \Phi_e+\sin \Psi_c \sin \delta_1-\delta_2$ \quad (14)

$Z_t=\cos \Phi_c \sin \gamma_1-\sin \Phi_c \sin \gamma_2-d\Psi$ \quad (15)

Equations (13)–(15) are the approximate transfer functions relating the reference system measurements and the individual platform error sources, i.e., the azimuth rotational tilt error $\gamma_1$ and $\gamma_2$, the elevation rotational tilt error $\Phi_e$ and $\delta_1$, the reflective surface non-orthogonality error $\delta_2$ and the elevation reference position error $\Psi_e$. The unity value for the X measurement error is interpreted as no error in the radial direction measured from the solar concentrator to the sun due to systematic errors, while the Y component represents the horizontal error and the Z component is the vertical error.

In order to completely define the total measurement error, the various embodiments consider several additional error sources. These additional error sources include: (a) the gravity bending of the structure as it is pointed at the sun ($g(\Psi_c)$), (b) the error in the elevation activator reference position and the elevation actuator transfer function, ($e(\Psi_c)$) and (c) the atmospheric refraction residual, i.e., ($r(\Psi_c)$). Including these additional terms, the following equations represent the total measurement error both in the horizontal and vertical directions, respectively.

$$HE = \sin\Psi_c \sin\Phi_c \sin\gamma_1 + \sin\Psi_c \cos\Phi_c \sin\gamma_2 - \cos\Psi_c \sin\Phi_e + \sin\Psi_c \sin\delta_1 - \delta_2 \quad (16)$$

$$VE = \cos\Phi_c \sin\gamma_1 - \sin\Phi_c \sin\gamma_2 - (-\Psi_e + g(\Psi_c) + e(\Psi_c) + r(\Psi_c)) \quad (17)$$

The three terms (g, e, r), in Equation 17 are only a function of the elevation angle of the solar tracker. As such, the component of the vertical track error introduced by these three errors is symmetrical about solar noon. Therefore:

$$g(\Psi_c)|_\Phi = g(\Psi_c)|_{-\Phi}$$
$$e(\Psi_c)|_\Phi = e(\Psi_c)|_{-\Phi}$$
$$r(\Psi_c)|_\Phi = r(\Psi_c)|_{-\Phi} \quad (18)$$

Note also that the first term in Equation (17) is also symmetric about due South.

Now that the approximate measurement equations are known, the determination of analytical expressions for the errors can proceed. First, the two azimuth plane tilt parameters, $\gamma_1$ and $\gamma_2$, are determined.

Assume that the sun sensor measurements are taken over the day from early morning until late evening. Further assume that points are taken symmetrically about the South axis such that for every measurement at $\Phi_c$ there is a corresponding measurement taken at $-\Phi_c$. Using these assumptions the vertical error measurement set is:

$$VE(\Phi_c) = \cos\Phi_c \sin\gamma_1 - \sin\Phi_c \sin\gamma_2 - (-\Psi_e + g(\Psi_c) + e(\Psi_c) + r(\Psi_c))$$
$$VE(-\Phi_c) = \cos\Phi_c \sin\gamma_1 + \sin\Phi_c \sin\gamma_2 - (-\Psi_e + g(\Psi_c) + e(\Psi_c) + r(\Psi_c)) \quad (19)$$

Subtracting these two equations and remembering the symmetry property from Equation (18), the following expression is obtained:

$$VE(\Phi_c) - VE(-\Phi_c) = -2\sin\Phi_c \sin\gamma_2 \quad (20)$$

Note also that the gravity bending term, the elevation transfer function term and the atmospheric refraction term cancel. While each of these terms is a function of the elevation angle, their functionality is weak—that is to say that for small differences in elevation angles, these terms are essentially the same and can be assumed to be equal, thus canceling when the two equations are subtracted. The resulting expression for the tilt parameter, $\gamma_2$, from each pair of vertical symmetrical measurements is:

$$\gamma_2 = \sin^{-1}\left[\frac{VE(-\Phi_c) - VE(\Phi_c)}{2\sin\Phi_c}\right] \quad (21)$$

The measurements indicated in Equation (21), e.g., the VE terms, contain random noise due to the measurement instruments. To reduce the effects of the noise, an estimate of the tilt parameter, $\gamma_2$ is obtained by averaging the values of the tilt parameter from each of symmetrical pairs taken during the day as follows:

$$\gamma_2 = \frac{1}{n}\sum_i \gamma_{2i} \quad (22)$$

wherein n is the total number of symmetric pairs and $\gamma_{2i}$ are the values of the tilt parameter resulting from Equation (21) being applied to each symmetric pair of measurements.

Similarly, the horizontal error measurement set is:

$$HE(\Phi_c) = (\sin\Psi_c)_\Phi \sin\Phi_c \sin\gamma_1 + (\sin\Psi_c)_\Phi \cos\Phi_c \sin\gamma_2 - (\cos\Psi_c)_\Phi \sin\Phi_e + (\sin\Psi_c)_\Phi \sin\delta_1 - \delta_2 \quad (23)$$

$$HE(-\Phi_c) = -(\sin\Psi_c)_{-\Phi} \sin\Phi_c \sin\gamma_1 + (\sin\Psi_c)_{-\Phi} \cos\Phi_c \sin\gamma_2 - (\cos\Psi_c)_{-\Phi} \sin\Phi_e + (\sin\Psi_c)_{-\Phi} \sin\delta_1 - \delta_2 \quad (24)$$

The notation for the elevation terms $(\ldots)_\Phi$ and $(\ldots)_{-\Phi}$, denote which side of the solar concentrator meridian, e.g., which side of due South, the horizontal measurements are made. The reason for the notation is that while the azimuth measurements are symmetric about due South, the corresponding elevation angles are not symmetrical and, in general, are not equal. This notation allows for keeping track of the fact that the elevation angles are, in general, not the same on each side of the tracker meridian.

Subtracting the two horizontal error measurements and keeping in mind that the elevation terms will not cancel, the following is obtained:

$$HE(\Phi_c) - HE(-\Phi_c) = [\sin\Phi_c \sin\gamma_1][(\sin\Psi_c)_\Phi + (\sin\Psi_c)_{-\Phi}] + \quad (25)$$
$$[\cos\Phi_c \sin\gamma_2 + \sin\delta_1][(\sin\Psi_c)_\Phi - (\sin\Psi_c)_{-\Phi}] -$$
$$\sin\Phi_e[(\cos\Psi_c)_\Phi - (\cos\Psi_c)_{-\Phi}]$$

Solving Equation (25) for the tilt parameter, $\gamma_1$:

$$\gamma_1 = \sin^{-1}\left\{\frac{HE(\Phi_c) - HE(-\Phi_c)}{\sin\Phi_c[(\sin\Psi_c)_\Phi + (\sin\Psi_c)_{-\Phi}]} - \frac{[\cos\Phi_c \sin\gamma_2 + \sin\delta_1][(\sin\Psi_c)_\Phi - (\sin\Psi_c)_{-\Phi}]}{\sin\Phi_c[(\sin\Psi_c)_\Phi + (\sin\Psi_c)_{-\Phi}]} + \frac{\sin\Phi_e[(\cos\Psi_c)_\Phi - (\cos\Psi_c)_{-\Phi}]}{\sin\Phi_c[(\sin\Psi_c)_\Phi + (\sin\Psi_c)_{-\Phi}]}\right\} \quad (26)$$

The appearance of a second unknown parameter, $\delta_1$, in the second term of Equation (26) precludes a general analytical solution for the tilt parameter. However, taking measurements at a time of year when the diurnal motion of the sun with respect to the solar concentrator produces little variation in the elevation angle, for symmetric azimuth commands, makes the estimate of the tilt parameter possible. Specifically, if measurements are taken at or near either the Summer or Winter Solstice, the apparent motion of the sun with respect to the solar concentrator is approximately symmetrical about the solar concentrator meridian. As such, the values of the elevation command ($\Psi_c$) for each symmetric azimuth command pair are nearly equal. When measurements are taken at this time of year, then, the second and third terms of Equation (26) are nearly zero. The equation for the tilt parameter then reduces to:

$$\gamma_1 = \sin^{-1}\left\{\frac{HE(\Phi_c) - HE(-\Phi_c)}{2\sin\Phi_c\sin\Psi_c}\right\} \quad (27)$$

At the Vernal and Autumnal Equinoxes, the daily change of the sun elevation position, for symmetric azimuths, during the day is at its maximum, e.g., the difference in the sun elevation between early morning and late afternoon can be as much as 5 mrad. This difference decreases as the sample point pairs are taken closer to solar noon. But, even when the symmetric azimuth samples are taken in the early morning and late afternoon, the possible difference of 5 mrad. between the corresponding elevation angles will make the second and third terms of Equation (26) second order and can thus be neglected. It is expected, then, that Equation (27) will produce a very good estimate of the second tilt parameter.

As in the case for the previous tilt parameter, $\gamma_2$, to get a final estimate of $\gamma_1$ and reduce the effects of measurement noise, a simple average over the set of tilt parameters obtained from each of the symmetrical pairs of measurements, e.g., the HE terms, taken during the day is performed as follows:

$$\gamma_1 = \frac{1}{n}\sum_i \gamma_{1i} \quad (28)$$

wherein n is the total number of symmetric pairs and $\gamma_{1i}$ are the values of the tilt parameter resulting from Equation (27) being applied to each symmetric pair of measurements.

Now that the azimuth tilt plane is known, an estimate of the remaining error terms in Equation (17) can proceed.

Solving for the unknown error terms in Equation (17) produces:

$$r(\Psi_c) + e(\Psi_c) + g(\Psi_c) - \Psi_e = -VE + \cos\Phi_c\sin\gamma_1 - \sin\Phi_c\sin\gamma_2 \quad (29)$$

The first, second and third terms on the left hand side of Equation (29) are a function of the elevation angle and the last term is a constant. The right hand side of Equation (29) can be curve fit with a polynomial using the measured values of VE, the commended azimuth angle $\Phi_c$, and the values of $\delta_1$ and $\delta_2$ determined from Equations (22) and (28). In this regard, the curve fit is a quadratic fit of the measurements as a function of elevation angle. This curve fit can then be used to correct for the combined errors on the left hand side of the equation. Note that it is difficult but not impossible to solve for the individual error terms if desired. For example, an inclinometer can be used to measure the gravitational bending. If the elevation linear actuator, i.e., the elevation jack, is set at the reference point accurately, then $e(\Psi_c)$ should be zero. The measurements are also preferably taken at high elevation angles so that refraction errors and the error residual, $r(\Psi_c)$ are minimized. The remaining unknown error, $\Psi_e$, can then be found easily. However, it is not necessary to determine the individual errors since only the combined errors are required for the control logic.

The remaining error parameters, $(\delta_1, \delta_2, \Phi_e)$ can be found from Equation (16). Solving this equation for the combined errors gives:

$$HE - \sin\Psi_c\sin\Phi_c\sin\gamma_1 - \sin\Psi_c\cos\Phi_c\sin\gamma_2 = -\cos\Psi_c\sin\Phi_e + \sin\Psi_c\sin\delta_1 - \delta_2 \quad (30)$$

Now define the following variables with the subscript "i" refers to the "ith" measurement:

$M_i$ is the left hand side of Equation (30)

$A = \sin\delta_1$ $B = \sin\Phi_e$ $C = \delta_2 \quad (31)$

Equation (30) can be rewritten as:

$$M_i = A\sin\Psi_i - B\cos\Psi_i - C \quad (32)$$

Let the square error function, V, be:

$$V = \sum_{i=1}^{n}(M_i - A\sin\Psi_i + B\cos\Psi_i + C)^2 \quad (33)$$

The curve fit coefficients (A, B and C) that relate the angle, $\Psi_i$, to the measurements, $M_i$, are then determined by taking the partial derivatives with respect to each of the coefficents (A, B and C), setting them to zero and solving simultaneously for them.

$$\frac{\partial V}{\partial A} = 0 = 2\sum_{i=1}^{n}(M_i - A\sin\Psi_i + B\cos\Psi_i + C)(-\sin\Psi_i) \quad (34)$$

Combining and rearranging gives:

$$A\sum_{i=1}^{n}\sin^2\Psi_i - B\sum_{i=1}^{n}\sin\Psi_i\cos\Psi_i - C\sum_{i=1}^{n}\sin\Psi_i = \sum_{i=1}^{n}M_i\sin\Psi_i \quad (35)$$

Similarly, the partial derivatives with respect to B and C yield the following equations, respectively:

$$A\sum_{i=1}^{n}\sin\Psi_i\cos\Psi_i - B\sum_{i=1}^{n}\cos^2\Psi_i - C\sum_{i=1}^{n}\cos\Psi_i = \sum_{i=1}^{n}M_i\cos\Psi_i \quad (36)$$

$$A\sum_{i=1}^{n}\sin\Psi_i - B\sum_{i=1}^{n}\cos\Psi_i - Cn = \sum_{i=1}^{n}M_i \quad (37)$$

To simplify the notation, make the following substitutions.

$$z = \sum_{i=1}^{n}\sin^2\Psi_i \quad y = \sum_{i=1}^{n}\sin\Psi_i\cos\Psi_i \quad x = \sum_{i=1}^{n}\sin\Psi_i \quad (38)$$

$$w = \sum_{i=1}^{n}M_i\sin\Psi_i \quad v = \sum_{i=1}^{n}\cos^2\Psi_i \quad u = \sum_{i=1}^{n}\cos\Psi_i$$

$$t = \sum_{i=1}^{n}M_i\cos\Psi_i \quad s = \sum_{i=1}^{n}M_i$$

Equations (36)–(38) can then be rewritten with the appropriate substitutions as follows:

$$Az - By - Cx = w \quad (39)$$

$$Ay - Bv - Cu = t \quad (40)$$

$$Ax - Bu - Cn = s \quad (41)$$

There are at least two ways to solve for the coefficients A, B and C. The first is to cast the set of equations as a matrix equation and solve for the coefficients using matrix algebra. Another way is by direct algebraic manipulation of the individual equations. The latter way is used here since the algebra and the matrix inversion associated with the former method require more complex mathematical manipulations.

Begin by multiplying Equation (39) by (−u), then multiply Equation (40) by (x) and add the two resulting equations together:

$$-Auz + Buy + Cux = -wu \qquad (42)$$

$$\underline{Ayx - Bvs - Cux = tx}$$

$$A(yx - uz) + B(uy - vx) = tx - wu$$

Next, multiply Equation (39) by (−n), multiply Equation (41) by (x) and add the two resulting equations together:

$$-Anz + ny + Cnx = -wn \qquad (43)$$

$$\underline{Ax^2 - Bux - Cnx = sx}$$

$$A(x^2 - nz) + B(ny - ux) = sx - wn$$

Now, multiply Equation (42) by −(ny−ux), multiply Equation (43) by (uy−vx) and add the two resulting equations together:

$$-A(yx-uz)(ny-ux) - B(uy-vx)(ny-ux) = -(tx-wu)(ny-ux) \qquad (44)$$

$$\underline{A(x^2-nz)(uy-vx) + B(uy-vx)(ny-ux) = (sx-wn)(uy-vx)}$$

$$A[(x^2-nz)(uy-vx) - (yx-uz)(ny-ux)] = (sx-wn)(uy-vx)$$
$$\qquad - (tx-wu)(ny-ux)$$

Solving for A:

$$A = \frac{(sx-wn)(uy-vx) - (tx-wu)(ny-ux)}{(x^2-nz)(uy-vx) - (yx-uz)(ny-ux)} \qquad (45)$$

Substitute A into Equation (43) and solve for B:

$$B = \frac{-A(x^2-nz) + (sx-wn)}{(ny-ux)} \qquad (46)$$

Now substitute for A and B in Equation (39) and solve for C:

$$C = \frac{Az - By - w}{x} \qquad (47)$$

The estimates of the three remaining errors are found as follows from the curve fit coefficients:

$$\delta_1 = \sin^{-1}(A)$$

$$\Phi_e = \sin^{-1}(B)$$

$$\delta_2 = C \qquad (48)$$

The control system 27 then determines the elevation and azimuth commands based at least partially upon the respective errors generated by the variety of error sources. In particular, the control system determines the azimuth command angle $\Phi_c$ and the elevation command angle $\Psi_c$ in order to align the centerline 15 defined by the reflective surface 12 of the solar concentrator 10 and the sun reference vector by taking into account or compensating for the effects of each of the variety of error sources described above. By way of explanation, the derivation of the various equations that relate the respective contributions of the various error sources to the elevation and azimuth commands determined by the control system of the present invention will be hereinafter described. The development of the equations begins by solving for the command angles from Equation (3). Multiply this equation by the inverse of the first four transition matrices and note also that the desired tracking vector is aligned along the $X_t$ axis.

$$T_\omega^{-1} T_{\delta_1}^{-1} T_\lambda^{-1} T_{\delta_2}^{-1} \begin{bmatrix} 1 \\ 0 \\ 0 \end{bmatrix} = T_{\gamma_2} T_{\gamma_1} \begin{bmatrix} x_r \\ y_r \\ z_r \end{bmatrix} \qquad (49)$$

Now, progressing through each multiplication step-by-step, the following is obtained.

The first multiplication:

$$T_{\delta_2}^{-1} \begin{bmatrix} 1 \\ 0 \\ 0 \end{bmatrix} = \begin{bmatrix} \cos\delta_2 & -\sin\delta_2 & 0 \\ \sin\delta_2 & \cos\delta_2 & 0 \\ 0 & 0 & 1 \end{bmatrix} \begin{bmatrix} 1 \\ 0 \\ 0 \end{bmatrix} = \begin{bmatrix} \cos\delta_2 \\ \sin\delta_2 \\ 0 \end{bmatrix} \qquad (50)$$

The next multiplication yields:

$$T_\lambda^{-1} T_{\delta_2}^{-1} \begin{bmatrix} 1 \\ 0 \\ 0 \end{bmatrix} = \begin{bmatrix} \cos\lambda & 0 & -\sin\lambda \\ 0 & 1 & 0 \\ \sin\lambda & 0 & \cos\lambda \end{bmatrix} \begin{bmatrix} \cos\delta_2 \\ \sin\delta_2 \\ 0 \end{bmatrix} = \begin{bmatrix} \cos\lambda\cos\delta_2 \\ \sin\delta_2 \\ \sin\lambda\cos\delta_2 \end{bmatrix} \qquad (51)$$

The third multiplication yields:

$$T_{\delta_1}^{-1} T_\lambda^{-1} T_{\delta_2}^{-1} \begin{bmatrix} 1 \\ 0 \\ 0 \end{bmatrix} = \begin{bmatrix} 1 & 0 & 0 \\ 0 & \cos\delta_1 & -\sin\delta_1 \\ 0 & \sin\delta_1 & \cos\delta_1 \end{bmatrix} \begin{bmatrix} \cos\lambda\cos\delta_2 \\ \sin\delta_2 \\ \sin\lambda\cos\delta_2 \end{bmatrix} \qquad (52)$$

$$= \begin{bmatrix} \cos\lambda\cos\delta_2 \\ \cos\delta_1\sin\delta_2 - \sin\lambda\sin\delta_1\cos\delta_2 \\ \sin\delta_1\sin\delta_2 + \sin\lambda\cos\delta_1\cos\delta_2 \end{bmatrix}$$

The final multiplication results in the following for the left hand side of Equation (49):

$$T_\omega^{-1} T_{\delta_1}^{-1} T_\lambda^{-1} T_{\delta_2}^{-1} \begin{bmatrix} 1 \\ 0 \\ 0 \end{bmatrix} = \qquad (53)$$

$$\begin{bmatrix} \cos\omega & -\sin\omega & 0 \\ \sin\omega & \cos\omega & 0 \\ 0 & 0 & 1 \end{bmatrix} \begin{bmatrix} \cos\lambda\cos\delta_2 \\ \cos\delta_1\sin\delta_2 - \sin\lambda\sin\delta_1\cos\delta_2 \\ \sin\delta_1\sin\delta_2 + \sin\lambda\cos\delta_1\cos\delta_2 \end{bmatrix} =$$

$$\begin{bmatrix} \cos\omega\cos\lambda\cos\delta_2 - \sin\omega\cos\delta_1\sin\delta_2 + \sin\omega\sin\lambda\sin\delta_1\cos\delta_2 \\ \sin\omega\cos\lambda\cos\delta_2 + \cos\omega\cos\delta_1\sin\delta_2 - \cos\omega\sin\lambda\sin\delta_1\cos\delta_2 \\ \sin\delta_1\sin\delta_2 + \sin\lambda\cos\delta_1\cos\delta_2 \end{bmatrix}$$

The next step is to expand the right hand side of Equation (49) and substitute Equation (1) for the reference vector.

$$T_{\gamma_2} T_{\gamma_1} \begin{bmatrix} x_r \\ y_r \\ z_r \end{bmatrix} = \begin{bmatrix} 1 & 0 & 0 \\ 0 & \cos\gamma_2 & \sin\gamma_2 \\ 0 & -\sin\gamma_2 & \cos\gamma_2 \end{bmatrix} \begin{bmatrix} \cos\gamma_1 & 0 & -\sin\gamma_1 \\ 0 & 1 & 0 \\ \sin\gamma_1 & 0 & \cos\gamma_1 \end{bmatrix} \begin{bmatrix} x_r \\ y_r \\ z_r \end{bmatrix} = \qquad (54)$$

$$\begin{bmatrix} \cos\gamma_1 & 0 & -\sin\gamma_1 \\ \sin\gamma_1\sin\gamma_2 & \cos\gamma_2 & \cos\gamma_1\sin\gamma_2 \\ \sin\gamma_1\cos\gamma_2 & -\sin\gamma_2 & \cos\gamma_1\cos\gamma_2 \end{bmatrix} \begin{bmatrix} \cos\Psi_r\cos\Phi_r \\ \cos\Psi_r\sin\Phi_r \\ \sin\Psi_r \end{bmatrix} =$$

$$\begin{bmatrix} \cos\gamma_1\cos\Psi_r\cos\Phi_r - \sin\gamma_1\sin\Psi_r \\ \sin\gamma_1\sin\gamma_2\cos\Psi_r\cos\Phi_r + \cos\gamma_2\cos\Psi_r\sin\Phi_r + \sin\Psi_r\cos\gamma_1\sin\gamma_2 \\ \sin\gamma_1\cos\Psi_r\cos\Phi_r\cos\gamma_2 - \sin\gamma_2\cos\Psi_r\sin\Phi_r + \cos\gamma_1\cos\gamma_2\sin\Psi_r \end{bmatrix}$$

The approach to finding the elevation command angle, $\Psi_c$, is to equate the third component of Equation (53) to the third component of Equation (54), solve for $\lambda$ and, using the definition $\lambda=\Psi_c+d\Psi$, solve for $\Psi_c$.

$$\sin\delta_1\sin\delta_2 + \sin\lambda\cos\delta_1\cos\delta_2 = \sin\gamma_1\cos\Psi_r\cos\Phi_r\cos\gamma_2 - \sin\gamma_2\cos\Psi_r\sin\Phi_r + \cos\gamma_1\cos\gamma_2\sin\Psi_r \quad (55)$$

$$\sin\lambda = \frac{\sin\gamma_1\cos\Psi_r\cos\Phi_r\cos\gamma_2 - \sin\gamma_2\cos\Psi_r\sin\Phi_r +}{\cos\delta_1\cos\delta_2} = \sin(\Psi_c + d\Psi) \quad (56)$$

Solving for the elevation command angle $\Psi_c$ yields:

$$\Psi_c = \sin^{-1}\left[\frac{\sin\gamma_1\cos\Psi_r\cos\Phi_r\cos\gamma_2 - \sin\gamma_2\cos\Psi_r\sin\Phi_r}{\cos\delta_1\cos\delta_2} + \frac{\cos\gamma_1\cos\gamma_2\sin\Psi_r - \sin\delta_1\sin\delta_2}{\cos\delta_1\cos\delta_2}\right] - d\Psi \quad (57)$$

Applying the small angle approximations provided earlier (Equation (6)), the equation defining the elevation command angle $\Psi_c$, simplifies to the following:

$$\Psi_c = \sin^{-1}(\sin\gamma_1\cos\Psi_r\cos\Phi_r - \sin\gamma_2\cos\Psi_r\sin\Phi_r + \sin\Psi_r) - d\Psi \quad (58)$$

To solve for the azimuth command angle $\Phi_c$ including the error source estimates, the following definitions are made to facilitate the derivation and notation.

$A = \cos\lambda\,\cos\delta_2$ $B = \cos\delta_1\sin\delta_2 - \sin\delta_1\cos\delta_2\sin\lambda$ $C = \cos\gamma_1\cos\Psi_r\cos\Phi_r - \sin\gamma_1\sin\Psi_r$ $D = \sin\gamma_1\sin\gamma_2\cos\Psi_r\cos\Phi_r + \cos\gamma_2\cos\Psi_r\sin\Phi_r + \sin\Psi_r\cos\gamma_1\sin\gamma_2 \quad (59)$ Substituting these definitions into Equations (53) and (54) and equating the first and second components of these equations yields the following:

$A\cos\omega - B\sin\omega = C$ $B\cos\omega + A\sin\omega = D \quad (60)$

Since $\omega=\Phi_c+\Phi_e$, the solution for the azimuth command angle becomes, from Equation (60):

$$\Phi_c = \cos^{-1}\left[\frac{AC + BD}{A^2 + B^2}\right] - \Phi_e \quad (61)$$

Note that the azimuth command contains $\lambda$ on the right-hand side which is a function of the elevation command angle $\Psi_c$ from Equation (57). The elevation command angle must therefore be solved for first. Also, because of this complexity, the equations for the elevation and azimuth commands cannot be solved separately.

Based upon the elevation and azimuth angle at which the sun is located as determined by the ephemeris equations and as a result of the relative contributions of the various error sources determined in the manner described above based upon the vertical and horizontal errors determined by the measurement system 26, the elevation and azimuth command angles can be readily determined from Equations (58) and (61), respectively. As such, the control system 27 of the present system includes an output section for providing signals representative of the elevation command and the azimuth command and, more particularly, the elevation and azimuth command angles, in order to command the solar concentrator 10 to a position that compensates for the vertical and horizontal errors detected by the measurement system.

Correspondingly, the apparatus of the present invention preferably includes a positioning mechanism, such as the motor 32 and the associated azimuthal and elevational drive mechanisms 34, 36 for receiving the signals provided by the output section of the control system 27 and for positioning the solar concentrator 10 based upon the elevation and azimuth commands. As such, the solar concentrator can be positioned such that the centerline 15 defined by the reflective surface 12 is aligned with the sun reference vector, thereby optimizing the collection of solar energy by the solar concentrator. By repeating this process of fine-tuning the position of the solar concentrator to compensate for each of the various error sources at a plurality of times throughout the day, the solar concentrator can remain trained upon the position of the sun even as the position of the sun and the corresponding position of the solar concentrator change.

As described above, the control system 27 includes a processing element 28. Typically, the processing element comprises one or more processors or other computing elements or devices for performing the functions described above. However, the processing element of the control system can include any type of processing element known to those skilled in the art that are capable of performing the functions described above. While the functions provided by the processing element can be provided by hardware, such as by an application specific integrated circuit (ASIC) or the like, the functionality is typically provided by a computer program product embodied within the processing element or stored within the memory device associated with the processing element and adapted for operation by the processing element. As such, one embodiment of the present invention provides a computer program product having a computer-readable storage medium, such as a read only memory device, a random access memory device or the like, having computer-readable program code provided therein for performing the various functions described above in conjunction with the processing element of the control system.

By way of example of the method and apparatus of the present invention, a simulation that was conducted during the summer solstice is hereinafter described. As explained in more detail below, the simulation included the following steps: (1) the azimuth and elevation command angles were input, (2) the actual or true errors applicable to the heliostat were then defined including any elevation angle dependency, (3) the vertical and horizontal error measurements taken at each azimuth/elevation setting of the heliostat during the day including the actual error in data obtained during the summer solstice were then defined, (4) the errors were then estimated in the same manner as if actual measurement data were available utilizing the vertical and horizontal error measurements defined in the preceding step, (5) the root mean square (RMS) error over the day was then determined, and (6) the azimuth and elevation commands were modified based upon the RMS error and the resulting effect on the errors is determined.

The initial step is to obtain the azimuth and elevation command angles $\Phi_c$ and $\Psi_c$ for the summer solstice as depicted in FIG. 10, such as from a data file. The data defining the azimuth and elevation command angles are representative data from a solar ephemeris model defining the azimuth and elevation angles to the sun from the heliostat during the solar day. As shown, the azimuth command angles are symmetrical about due south from the heliostat meridian. There are twenty-four symmetric pairs of azimuth/elevation data used in this example. Thus, the total number of measurements k in this simulation is forty-eight, while the number of symmetric pairs n is twenty-four. Moreover, the subscripts i and j are defined as i=1 . . . k and j=1 . . . n.

The second step in this example is to define the true errors applicable to the heliostat as described above and defined below. The error model is also defined, as denoted by the variable "noise", representing the error associated with the measurement sensor.

Noise =0.5 mrad $$\text{uniformly distributed between } +/- \frac{\text{noise}}{2} = 0.25 \text{ mrad}$$

$\delta_1 = -2$ mrad $\delta_2 = 2$ mrad
$\Phi_e = 5$ mrad $\gamma_1 = 5$ mrad $\gamma_2 = 5$ mrad
$\Psi_e = 1$ mrad The data defining the gravitational residue error g, the elevation transfer function error e and the error due to atmospheric refraction r are also obtained from data files. The data is only dependent upon the elevation angle and, once obtained, the data is applied symmetrically about the heliostat meridian to provide the data for use as a function of azimuth angle. For purposes of this example, the gravitational residue error g, the elevation transfer function error e and the error due to atmospheric refraction r are collectively termed system elevation errors and are depicted in FIG. 11.

As described above, $d\Psi_{tj} = g_j + e_j + r_j - \Psi_e$ can therefore also be defined as the combined true elevation error shown in FIG. 12, wherein $\Psi_e$ is the true error defined above. As defined below, $d\Psi_{truej}$ is the combination of the gravitational residue error g, the elevation transfer function error e and the error due to atmospheric refraction r as well as the elevation reference error. For negative azimuth command angles, $d\Psi_{truej}$ is defined as: $d\Psi_{truej} = d\Psi_{tj}$. For positive azimuth command angles, $d\Psi_{truej}$ is defined as: $d\Psi_{true_{n+j}} = d\Psi_{truej_{n-j+1}}$. $d\Psi_{truei}$ is termed the true elevation error and is also depicted in FIG. 13.

The third step is a definition of equations used to calculate the vertical and horizontal measurement errors. As defined above by equations (4) and (5), the vertical and horizontal measurement errors are defined as follows:

$$VEm(Z_t, X_t) = a\tan\left[\frac{Z_t}{X_t}\right]$$

$$HEm(Y_t, X_t) = a\tan\left[\frac{Y_t}{X_t}\right]$$

This step also includes the calculation of the measurement errors using the heliostat and system errors defined in the prior step and the pointing commands from the initial step. These calculations represent the errors that would have been measured during the day for this simulation. In particular, the vertical measurement errors are determined utilizing the transformation matrix of FIG. 8 including measurement noise. The true value of the vertical measurement error with no noise is defined below:

$$VE_{\Phi ti} = VEm(Z_{ti}, X_{ti})$$

In addition, the measured value of the vertical measurement error which includes noise is defined as follows:

$$VE_{\Phi i} = VE_{\Phi ti} + \text{noise}(rnd(1)-0.5)$$

wherein (rnd(1)−0.5) is a function that produces a uniformly distributed random number between −0.5 and 0.5.

In each of these equations, the variables $\omega_i$, $\lambda_i$, $Z_{ti}$ and $X_{ti}$ are defined as follows:

$$\omega_i = \phi_{ci} + \Phi_e$$

$$\lambda_i = \psi_{ci} + d\Psi_{truei}$$

$$Z_{ti} = T_{31}(\delta_1, \delta_2, \gamma_1, \gamma_2, \lambda_i,$$

$$\omega_i)\cos(\psi_{ci})\cos(\phi_{ci}) + T_{32}$$

$$(\delta_1, \delta_2, \gamma_1, \gamma_2, \lambda_i, \omega_i)$$

$$\cos(\psi_{ci})\sin(\phi_{ci}) + T_{33}$$

$$(\delta_1, \delta_2, \gamma_1, \gamma_2, \lambda_i,$$

$$\omega_i)\sin(\psi_{ci})$$

$$X_{ti} = T_{11}(\delta_1, \delta_2, \gamma_1, \gamma_2, \lambda_i, \omega_i)$$

$$\cos(\psi_{ci})\cos(\phi_{ci}) + T_{12}$$

$$(\delta_1, \delta_2, \gamma_1, \gamma_2, \lambda_i,$$

$$\omega_i)\cos(\psi_{ci})\sin(\phi_{ci}) + T_{13}$$

$$(\delta_1, \delta_2, \gamma_1, \gamma_2, \lambda_i,$$

$$\omega_i)\sin(\psi_{ci})$$

The vertical measurement errors are depicted in FIG. 14 in which the solid line represents the true vertical measurement error and the square boxes represent the measured values of the vertical measurement error.

Similarly, both the true and measured values of the horizontal measurement error are determined as follows:

$$HE_{\Phi ti} = HEm(Y_{ti}, X_{ti})$$

$$HE_{\Phi i} = HE_{\Phi ti} + \text{noise}(rnd(1)-0.5)$$

In this regard, variable $Y_{ti}$ is defined as follows:

$$X_{ti} = T_{11}(\delta_1, \delta_2, \gamma_1,$$

$$\gamma_2, \lambda_i, \omega_i)\cos(\psi_{ci})$$

$$\cos(\phi_{ci}) + T_{12}(\delta_1, \delta_2,$$

$$\gamma_1, \gamma_2, \lambda_i, \omega_i)$$

$$\cos(\psi_{ci})\sin(\phi_{ci}) + T_{13}$$

$$(\delta_1, \delta_2, \gamma_1, \gamma_2, \lambda_i,$$

$$\omega_i)\sin(\psi_{ci})$$

Similar to the true and measured values of the vertical measurement error, the true measured values of the horizontal measurement error are depicted in FIG. 15 in which the solid line represents the true value of the horizontal measurement error and the square boxes represent the measured values of the horizontal measured error.

The data from the prior step representing the collective vertical and horizontal measurement errors is then processed to determine the individual error terms. Based on these error terms, the commands used on subsequent days can be refined to reduce the measurement errors and thus increase the efficiency of the heliostat. The first tilt parameter is estimated as follows:

$$\gamma_{1ej} = a\sin\left[\frac{HE_{\phi k-j+1} - HE_{\phi j}}{2|\sin(\phi_{cj})||\sin(\psi_{cj})|}\right]$$

The mean value of the first tilt parameter can therefore be defined as $$\gamma_{1est} = \frac{1}{n}\sum_{j}\gamma_{1ej}$$

Based upon the horizontal measurement errors depicted in FIG. 15 and the azimuth and elevation command angles depicted in FIG. 10, the first tilt parameter is 4.86 mrad. To determine the error that arises as a result of utilizing the mean value of the first parameter, the mean estimation error can be determined as follows:

$$me_{\gamma 1} = \gamma_{1est} - \gamma_1$$

In this instance, the mean estimation error is equal to −0.13 mrad. In addition, the percent estimation error can be defined as follows:

$$\frac{me_{\gamma 1}}{\gamma_1} = -2.6\%$$

Similarly, the second tilt parameter can be defined as follows:

$$\lambda_{2ej} = a\sin\left[\frac{VE_{\phi j} - VE_{\phi k-j+1}}{2|\sin(\phi_{cj})|}\right]$$

The mean value of the second tilt parameter can then be defined as:

$$\gamma_{2est} = \frac{1}{n}\sum_{j}\gamma_{2ej}$$

For the vertical measurement error depicted in FIG. 14, and the azimuth and elevation command angles of FIG. 10, the mean value of the second tilt parameter is 5.00 mrad. In the same manner as defined above, the mean estimation error is 0.003 mrad and the percent estimation error is 0.05%.

The combined error term $d\Psi$ is then estimated. In this regard, there are k, e.g., 2n, values of this error term corresponding to each azimuth command with n values on each side of the tracker median. The values for the combined error term including the estimated tilt parameters are as follows:

$$d\Psi_i = -(VE_{\phi i} - \cos(\phi_{ci})\sin(\gamma_{1est}) + \sin(\phi_{ci})\sin(\gamma_{2est}))$$

The true and measured values of the combined error term $d\Psi$ are depicted in FIGS. 16a and 16b as a function of azimuth and elevation command angles, respectively.

The estimation of the combined error term $d\Psi$ is based on a quadratic fit of the elevation dependant data for dl as defined above. The definition of intermediate variables to facilitate the solution of the quadratic equations are as follows:

$$a = \sum_i \psi_{ci} \quad a = 41.375 \quad c = \sum_i (\psi_{ci})^2 \quad c = 41.557$$

$$d = \sum_i (\psi_{ci})^3 \quad d = 45.749 \quad e = \sum_i (\psi_{ci})^4 \quad e = 53.214$$

$$f = \sum_i d\Psi_i \quad f = 0.011 \quad g = \sum_i d\Psi_i\psi_{ci} \quad g = 0.018$$

$$h = \sum_i (\psi_{ci})^2 d\Psi_i \quad h = 0.025$$

As a result, the quadratic coefficients are:

$$b_2 = \frac{(ac-kd)(af-kg) - (a^2-kc)(cf-kh)}{(ac-kd)^2 - (c^2-ke)(a^2-kc)} = 0.00237$$

$$b_1 = \frac{(cf-kh) - (c^2-ke)b_2}{ac-kd} = -0.002599$$

$$b_0 = \frac{f - ab_1 - cb_2}{k} = 0.00042$$

Thus, the estimated elevation error is $$d\Psi_{esti} = b_0 + b_1\psi_{ci} + b_2(\psi_{ci})^2$$

The estimated elevation error can be plotted along with the true and measured values of the combined error term $d\Psi$ as shown in FIG. 17. Over the day, the RMS error for $d\Psi$ can therefore be defined as follows:

$$RMS_{d\Psi} = \sqrt{\frac{1}{k}\sum_i (d\Psi_{esti} - d\Psi_{truei})^2} = 0.0647 \text{ mrad}$$

The error terms $\Phi_e$, $\delta 1$ and $\delta 2$ are then estimated. In this regard, based upon the left hand side of equation (30), horizontal measurement errors for negative and positive azimuth commands are defined as follows:

$$M_{\phi i} = HE_{\phi i} - \sin(\psi_{ci})\sin(\phi_{ci})\sin(\gamma_{1est}) - \sin(\psi_{ci})\cos(\phi_{ci})\sin(\gamma_{2est})$$

For purposes of illustration, the horizontal measurements errors as a function of azimuth and elevation command angles are depicted in FIGS. 18a and 18b, respectively.

The substitution values are then calculated as follows:

$$s = \sum_i M_{\phi i} \qquad s = -0.312 \quad t = \sum_i M_{\phi i}\cos(\psi_{ci}) \quad t = -0.201$$

$$u = \sum_i \cos(\psi_{ci}) \qquad u = 29.332 \quad v = \sum_i \cos^2(\psi_{ci}) \quad v = 21.040$$

$$w = \sum_i M_{\phi i}\sin(\psi_{ci}) \qquad w = -0.214 \quad x = \sum_i \sin(\psi_{ci}) \quad x = 34.267$$

$$y = \sum_i \sin(\psi_{ci})\cos(\psi_{ci}) \quad y = 18.272 \quad z = \sum_i \sin^2(\psi_{ci}) \quad z = 26.960$$

The curve fit coefficients are then calculated using Equations (45)–(47) as follows:

$$A = \frac{(sx-wk)(uy-vx)-(tx-wu)(ky-ux)}{(x^2-kz)(uy-vx)-(yx-uz)(ky-ux)} = -0.00214$$

$$B = \frac{-A(x^2-kz)+(sx-wk)}{ky-ux} = 0.00518$$

$$C = \frac{Az-By-w}{x} = -.00181$$

The parameters are then estimated:

$\delta_{2est} = C \qquad \delta_{2est} = 1.81$ mrad $me_{\delta 2} = \delta_{2est} - \delta_2 \quad me_{\delta 2} = -0.19$ mrad $\quad \frac{me_{\delta 2}}{\delta_2} = -9.5\%$ $\Phi_{eest} = a\sin(B) \qquad \Phi_{eest} = 5.18$ mrad $me_{\Phi e} = \Phi_{eest} - \Phi_e \quad me_{\Phi e} = 0.18$ mrad $\quad \frac{me\Phi e}{\Phi_e} = 3.5\%$ $\delta_{1est} = a\sin(A) \qquad \delta_{1est} = -2.14$ mrad $me_{\delta 1} = \delta_{1est} - \delta_1 \quad me_{\delta 1} = -0.14 \qquad \frac{me_{\delta 1}}{\delta_1} = 6.9\%$ Finally, a check of the curve fit to the data can be performed as shown in FIGS. 19*a* and 19*b* and as defined below:

$$MM_{\Phi i} = A\sin(\psi_{ci}) - B\cos(\psi_{ci}) - C$$

In the next step, the X, Y and Z estimation errors are determined as follows:

$X_{esti} = T_{11}(\delta_{1est}, \delta_{2est},$ $\gamma_{1est}, \gamma_{2est}, \lambda_{esti},$ $\omega_{esti})\cos(\psi_{ci})\cos(\phi_{ci}) + T_{12}$ $(\delta_{1est}, \delta_{2est}, \gamma_{1est}, \gamma_{2est}, \lambda_{esti},$ $\omega_{esti})\cos(\psi_{ci})\sin(\phi_{ci}) + T_{13}$ $(\delta_{1est}, \delta_{2est}, \gamma_{1est}, \gamma_{2est},$ $\lambda_{esti}, \omega_{esti})\sin(\psi_{ci})$ $Y_{esti} = T_{21}(\delta_{1est}, \delta_{2est}, \gamma_{1est}, \gamma_{2est}, \lambda_{esti},$ $\omega_{esti})\cos(\psi_{ci})\cos(\phi_{ci}) + T_{22}$ $(\delta_{1est}, \delta_{2est}, \gamma_{1est}, \gamma_{2est},$ $\lambda_{esti}, \omega_{esti})\cos(\psi_{ci})\sin(\phi_{ci})$ $+ T_{23}(\delta_{1est}, \delta_{2est}, \gamma_{1est}, \gamma_{2est},$ $\lambda_{esti}, \omega_{esti})\sin(\psi_{ci})$ $Z_{esti} = T_{31}(\delta_{1est}, \delta_{2est}, \gamma_{1est}, \gamma_{2est}, \lambda_{esti},$ $\omega_{esti})\cos(\psi_{ci})\cos(\phi_{ci}) + T_{32}(\delta_{1est}, \delta_{2est}, \gamma_{1est}, \gamma_{2est}, \lambda_{esti},$ $\omega_{esti})\cos(\psi_{ci})\sin(\phi_{ci}) + T_{33}$ $(\delta_{1est}, \delta_{2est}, \gamma_{1est}, \gamma_{2est}, \lambda_{esti},$ $\omega_{esti})\sin(\psi_{ci})$ wherein $\lambda_{esti} = \psi_{ci} + d\Psi_{esti}$ $\omega_{esti} = \phi_{ci} + \Phi_{eest}$ The estimated vertical measurement RMS error can then be determined as follows:

$VE_{ei} = VEm(Z_{esti}, X_{esti})$ $RMS_{VE} = \sqrt{\frac{1}{k}\sum_i (VE_{ei} - VE_{\phi ti})^2} \qquad RMS_{VE} = 0.040$ mrad The estimated horizontal measurement RMS error can also be determined as follows:

$HE_{ei} = HEm(Y_{esti}, X_{esti})$ $RMS_{HE} = \sqrt{\frac{1}{k}\sum_i (HE_{ei} - HE_{\phi ti})^2} \qquad RMS_{HE} = 0.087$ The vertical and horizontal measurement RMS errors are depicted in FIGS. 20*a* and 20*b*, respectively, as a function of azimuth angle. As depicted, the true values of the vertical and horizontal measurement errors and the estimated values of the vertical and horizontal measurement errors track very closely. As this simulation depicts, therefore, the method and apparatus of the present invention can closely approximate the errors throughout the day such that the heliostat or other solar concentrator remains trained on the sun, thereby increasing the efficiency of solar collection.

The final step of the simulation determines the revised open-loop azimuth and elevation commands to reduce the measurement errors using the error estimates that were previously determined. This step includes two parts. The first part verifies that the resulting corrected commands, using the true errors, results in a near zero measurement error. The second part uses the estimated errors to compute the corrected commands and then presents the resulting mathematical errors.

In the first part of this step, the revised open-loop azimuth and elevation commands are computed in order to reduce the measurement errors using the foregoing error estimates. In this regard, the corrected elevation rotation is computed using Equation (36) as follows:

$$\lambda_{cc}(\Psi, \Phi, \gamma_1, \gamma_2, \delta_1 \delta_2) = a\sin\left[\frac{\sin(\gamma_1)\cos(\Psi)\cos(\Phi)\cos(\gamma_2) - \sin(\gamma_2)\cos(\Psi)\sin(\Phi) + \cos(\gamma_1)\cos(\gamma_2)\sin(\Psi) - \sin(\delta_1)\sin(\delta_2)}{\cos(\delta_1)\cos(\delta_2)}\right]$$

while the corrected azimuth rotation is calculated from Equation (21) as follows:

$$\cos\omega(A, B, C, D) = \frac{AC + BD}{A^2 + B^2}$$

The corrected elevation command history using the true errors is then determined as follows:

$\lambda_{cti} = \lambda_{cc}(\psi_{ci}, \phi_{ci}, \gamma_1, \gamma_2, \delta_1, \delta_2)$ The corrected azimuth command history using the true errors is then also determined as follows:

$A_i = \cos(\lambda_{cti})\cos(\delta_2)$ $B_i = \cos(\delta_1)\sin(\delta_2) - \sin(\delta_1)\cos(\delta_2)\sin(\lambda_{cti})$ $C_i = \cos(\gamma_1)\cos(\psi_{ci})\cos(\phi_{ci}) - \sin(\psi_{ci})\sin(\gamma_1)$ $D_i=\sin(\gamma_1)\sin(\gamma_2)\cos(\psi_{ci})\cos(\phi_{ci})+\cos(\gamma_2)\cos(\psi_{ci})\sin(\phi_{ci})+\sin(\psi_{ci})\cos(\gamma_1$ $\omega_{cti}=a\cos[\cos\omega(A_i,B_i,C_i,D_i)]$ The vertical and horizontal errors are then determined using the revised commands with no noise as follows:

$X_{cori}=T_{11}(\delta_1,\delta_2,\gamma_1,\gamma_2,\lambda_{cti},$ $\omega_{cti})\cos(\psi_{ci})\cos(\phi_{ci})+T_{12}$ $(\delta_1,\delta_2,\gamma_1,\gamma_2,\lambda_{cti},$ $\omega_{cti})\cos(\psi_{ci})\sin(\phi_{ci})+T_{13}$ $(\delta_1,\delta_2,\gamma_1,\gamma_2,\lambda_{cti},$ $\omega_{cti})\sin(\psi_{ci})$ $Y_{cori}=T_{21}(\delta_1,\delta_2,\gamma_1,\gamma_2,\lambda_{cti},$ $\omega_{cti})\cos(\psi_{ci})+T_{22}$ $(\delta_1,\delta_2,\gamma_1,\gamma_2,$ $\lambda_{cti},\omega_{cti})\cos(\psi_{ci})\sin(\phi_{ci})$ $+T_{23}(\delta_1,\delta_2,\gamma_1,\gamma_2,$ $\lambda_{cti},\omega_{cti})\sin(\psi_{ci})$ $Z_{cori}=T_{31}(\delta_1,\delta_2,\gamma_1,\gamma_2,\lambda_{cti},$ $\omega_{cti})\cos(\psi_{ci})\cos(\phi_{ci})+T_{32}$ $(\delta_1,\delta_2,\gamma_1,\gamma_2,\lambda_{cti},$ $\omega_{cti})\cos(\psi_{ci})\sin(\phi_{ci})+T_{33}$ $(\delta_1,\delta_2,\gamma_1,\gamma_2,$ $\lambda_{cti},\omega_{cti})\sin(\psi_{ci})$ The resulting vertical error is depicted in FIG. 21a and is defined as follows:

$VED_{\phi corri}=VEm(Z_{cori},X_{cori})$

Likewise, the horizontal error is depicted in FIG. 21b and is defined as follows:

$HE_{\phi corri}=HEm(Y_{cori},X_{cori})$

In the second part of this step, the corrected azimuth and elevation commands are determined using the estimated errors and the resulting vertical and horizontal measurement errors are then assessed. In this instance, it should be noted that only residual errors are utilized in the equations for the vertical and horizontal error estimates.

Initially, the corrected elevation command history is determined using the estimated errors as follows:

$\lambda_{cei}=\lambda_{cc}(\psi_{ci},\phi_{ci},\gamma_{1est},\gamma_{2est},\delta_{1est},\delta_{2est})$ The corrected azimuth command history is also determined using the estimated errors as follows:

$A_i=\cos(\lambda_{cei})\cos(\delta_{2est})$ $B_i=\cos(\delta_{1est})\sin(\delta_{2est})-\sin(\delta_{1est})\cos(\delta_{2est})\sin(\lambda_{cei})$ $C_i=\cos(\gamma_{1est})\cos(\psi_{ci})\cos(\phi_{ci})-\sin(\psi_{ci})\sin(\gamma_{1est})$ $D_i=\sin(\gamma_{1est})\sin(\gamma_{2est})\cos(\psi_{ci})\cos(\phi_{ci})+\cos(\gamma_{2est})\cos(\psi_{ci})\sin(\phi_{ci})+\sin(\psi_{ci})\cos(\gamma_{1est})\sin(\gamma_{2est})$ $\omega_{cei}=a\cos[\cos\omega(A_i,B_i,C_i,D_i)]$ The vertical and horizontal errors are then determined using the revised commands with no noise as follows:

$X_{cor1i}=T_{11}(\delta_1,\delta_2,\gamma_1,\gamma_2,\lambda_{cei},$ $\omega_{cei})\cos(\psi_{ci})\cos(\phi_{ci})+T_{12}$ $(\delta_1,\delta_2,\gamma_1,\gamma_2,\lambda_{cei},$ $\omega_{cei})\cos(\psi_{ci})\sin(\phi_{ci})+T_{13}$ $(\delta_1,\delta_2,\gamma_1,\gamma_2,\lambda_{cei},$ $\omega_{cei})\sin(\psi_{ci})$ $Y_{cor1i}=T_{21}(\delta_1,\delta_2,\gamma_1,\gamma_2,\lambda_{cei},$ $\omega_{cei})\cos(\psi_{ci})\cos(\phi_{ci})+T_{22}$ $(\delta_1,\delta_2,\gamma_1,\gamma_2,\lambda_{cei},$ $\omega_{cei})\cos(\psi_{ci})\sin(\phi_{ci})+T_{23}$ $(\delta_1,\delta_2,\gamma_1,\gamma_2,\lambda_{cei},$ $\omega_{cei})\sin(\psi_{ci})$ $Z_{cor1i}=T_{31}(\delta_1,\delta_2,\gamma_1,\gamma_2,\lambda_{cei},$ $\omega_{cei})\cos(\psi_{ci})\cos(\phi_{ci})+T_{32}$ $(\delta_1,\delta_2,\gamma_1,\gamma_2,\lambda_{cei},$ $\omega_{cei})\cos(\psi_{ci})\sin(\phi_{ci})+T_{33}$ $(\delta_1,\delta_2,\gamma_1,\gamma_2,\lambda_{cei},$ $\omega_{cei})\cos(\psi_{ci})\cos(\phi_{ci})\sin(\psi_{ci})$ As shown in FIG. 22a, the vertical error is defined as:

$VE_{\phi corri}=VEm(Z_{cor1i},X_{cor1i})$

As shown in FIG. 22b, the horizontal error is also defined as:

$HE_{\phi corri}=HEm(Y_{cor1i},X_{cor1i})$

Finally, the RMS Error can be determined using uncorrected commands as follows:

Vertical error $\quad RMS2_{VE}=\sqrt{\frac{1}{k}\sum_i(VE_{\phi i})^2}\quad RMS2_{VE}=4.77$ mrad Horizontal error $\quad RMS2_{HE}=\sqrt{\frac{1}{k}\sum_i(HE_{\phi i})^2}\quad RMS2_{HE}=6.793$ mrad In addition, the RMS error can be determined using corrected commands as follows:

Vertical error $\quad RMS1_{VE}=\sqrt{\frac{1}{k}\sum_i(VE_{\phi corri})^2}\quad RMS1_{VE}=0.055$ mrad Horizontal error $\quad RMS1_{HE}=\sqrt{\frac{1}{k}\sum_i(HE_{\phi corri})^2}\quad RMS1_{HE}=0.128$ mrad As shown, refining the azimuth and elevation commands based upon the errors from a prior day significantly improves the performance of the solar concentrator on subsequent days since the solar concentrator will remain trained more closely upon the sun. As such, the method and apparatus of the present invention permits a solar concentrator to collect a greater percentage of the incident light.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of controllably positioning a solar concentrator comprising:
   determining a vertical error and a horizontal error between a centerline of the solar concentrator and a sun reference vector;
   determining an elevation command and an azimuth command to compensate for the vertical error and the horizontal error, wherein determining the elevation command and the azimuth command comprises:
      determining respective errors generated by a plurality of error sources that contribute to at least one of the vertical error and the elevation error, wherein the plurality of error sources include at least one error source selected from a system elevation error group consisting of a gravitational residue error g, an elevation transfer function error e and an error r due to atmospheric refraction, and wherein determining the respective errors comprises determining a respective contribution to at least one of the vertical error and the horizontal error that is attributable to at least one error source selected from the system elevation error group and that is independent of any contribution from any error source outside of the system elevation error group; and
      determining the elevation command and the azimuth command at least partially based upon the respective errors generated by the plurality of error sources; and
   positioning the solar concentrator based upon the elevation command and the azimuth command in order to compensate for the vertical error and the horizontal error.

2. A method according to claim 1 wherein said determining and positioning steps are repeated at a plurality of different times throughout a day.

3. A method according to claim 1 wherein determining the vertical error and the horizontal error comprises:
   moving the solar concentrator from a nominal position to an aligned position at which a difference between gas temperatures of each quadrant of the solar concentrator is minimized; and
   determining the horizontal and vertical distances that the solar concentrator is moved from the nominal position to the aligned position.

4. A method according to claim 1 wherein determining the vertical error and the horizontal error comprises:
   moving the solar concentrator from a nominal position to an aligned position at which a maximum power factor is obtained; and
   determining the horizontal and vertical distances that the solar concentrator is moved from the nominal position to the aligned position.

5. A method according to claim 1 wherein determining the elevation command comprises determining an elevation command angle $\Psi_c$ as follows:

$$\Psi_c = \sin^{-1}(\sin \gamma_1 \cos \Psi_r \cos \Phi_r - \sin \gamma_2 \cos \Psi_r \sin \Phi_r + \sin \Psi_r) - d\Psi$$

wherein $\gamma_1$ and $\gamma_2$ are azimuth rotational tilt errors, $\Phi_r$ and $\Psi_r$ are elevation and azimuth angles, respectively, in an inertial reference system that are required to align the centerline of the solar concentrator and a sun reference vector, and $d\Psi$ is a combination of the elevation transfer function error, the gravitational residual error, and the error due to atmospheric refraction.

6. A method according to claim 1 wherein determining the azimuth command comprises determining an azimuth command angle $\Phi_c$ as follows:

$$\Phi_c = \cos^{-1}\left[\frac{AC + BD}{A^2 + B^2}\right] - \Phi_e$$

wherein A, B, C and D are defined as follows:

$$A = \cos \lambda \cos \delta_2$$

$$B = \cos \delta_1 \sin \delta_2 - \sin \delta_1 \cos \delta_2 \sin \lambda$$

$$C = \cos \gamma_1 \cos \Psi_1 \cos \Phi_r - \sin \gamma_1 \sin \Psi_r$$

$$D = \sin \gamma_1 \sin \gamma_2 \cos \Psi_r \cos \Phi_r + \cos \gamma_2 \cos \Psi_r \sin \Phi_r + \sin \Psi_r \cos \gamma_1 \sin \gamma_2$$

wherein $\lambda$ is defined as follows:

$$\lambda = \Psi_c - \Psi_e + g(\Psi_c) + e(\Psi_c) + r(\Psi_c)$$

wherein $\Psi_c$ is an elevation command angle, $\Psi_e$ is an elevation reference position error, $g\Psi_c$ is a gravitational residue error, $e\Psi_c$ is an elevation transfer function error and $r\Psi_c$ is an error due to atmospheric refraction, and wherein $\delta_1$ is an elevation rotational tilt error, $\delta_2$ is a reflective surface non-orthogonality error, $\gamma_1$ and $\gamma_2$ are azimuth rotational tilt errors and $\Psi_r$ and $\Phi_r$ are elevation and azimuth angles, respectively, in an inertial reference system that are required to align the centerline of the solar concentrator and a sun reference vector.

7. A method according to claim 1 wherein determining the vertical error and the horizontal error comprises obtaining sun pointing error measurement information with at least one of a sun sensor and a digital image radiometer.

8. A method of controllably positioning a solar concentrator comprising:
   determining a vertical error and a horizontal error between a centerline of the solar concentrator and a sun reference vector;
   determining an elevation command and an azimuth command to compensate for the vertical error and the horizontal error, wherein determining the elevation command and the azimuth command comprises:
      determining respective errors generated by a plurality of error sources that contribute to at least one of the vertical error and the elevation error, wherein the plurality of error sources include at least one error source selected from the group consisting of a gravitational residue error g, an elevation transfer function e and an error r due to atmospheric refraction, and wherein determining the respective errors comprises individually determining each of a first azimuth rotational tilt error $\gamma_1$, a second azimuth rotational tilt error $\gamma_2$, a first elevation rotational tilt error $\Phi_e$, a second elevation rotational tilt error $\delta_1$, and a reflective surface non-orthogonality error $\delta_2$; and determining the elevation command and the azimuth command at least partially based upon the respective errors generated by the plurality of error sources; and positioning the solar concentrator based upon the elevation command and the azimuth command in order to compensate for the vertical error and the horizontal error.

9. A method of controllably positioning a solar concentrator comprising:

determining a vertical error and a horizontal error between a centerline of the solar concentrator and a sun reference vector;

determining an elevation command and an azimuth command to compensate for the vertical error and the horizontal error, wherein determining the elevation command and the azimuth command comprises:

determining respective errors generated by a plurality of error sources that contribute to at least one of the vertical error and the elevation error, wherein the plurality of error sources include at least one error source selected from the group consisting of a gravitational residue error g, an elevation transfer function error e and an error r due to atmospheric refraction, and wherein determining the respective errors comprises collectively determining the gravitational residue error g, the elevation transfer function error e and the error r due to atmospheric refraction; and determining the elevation command and the azimuth command at least partially based upon the respective errors generated by the plurality of error sources; and positioning the solar concentrator based upon the elevation command and the azimuth command in order to compensate for the vertical error and the horizontal error.

10. An apparatus for controllably positioning a solar concentrator comprising:

a measurement system for determining a vertical error and a horizontal error between a centerline of the solar concentrator and a sun reference vector;

a processing element, responsive to said measurement system, for determining an elevation command and an azimuth command to compensate for the vertical error and the horizontal error, wherein said processing element determines respective errors generated by a plurality of error sources that contribute to at least one of the vertical error and the elevation error, wherein the plurality of error sources include at least one error source selected from a system elevation error group consisting of a gravitational residue error g, an elevation transfer function error e and an error r due to atmospheric refraction, wherein said processor determines the respective errors by determining a respective contribution to at least one of the vertical error and the horizontal error that is attributable to at least one error source selected from the system elevation error group and that is independent of any contribution from any error source outside of the system elevation error group, and wherein said processing element determines the elevation command and the azimuth command at least partially based upon the respective errors generated by the plurality of error sources; and a positioning mechanism, responsive to said processing element, for positioning the solar concentrator based upon the elevation command and the azimuth command in order to compensate for the vertical error and the horizontal error.

11. An apparatus according to claim 10 wherein said measurement system repeatedly determines the vertical error and the horizontal error at a plurality of different times throughout a day.

12. An apparatus according to claim 10 wherein said processing element determines the respective errors by individually determining each of a first azimuth rotational tilt error $\gamma_1$, a second azimuth rotational tilt error $\gamma_2$, a first elevation rotational tilt error $\Phi_e$, a second elevation rotational tilt error $\delta_1$, and a reflective surface non-orthogonality error $\delta_2$.

13. An apparatus according to claim 10 wherein said measurement system is adapted to move the solar concentrator from a nominal position to an aligned position at which a maximum power factor is obtained, and wherein said measurement system is further adapted to determine the horizontal and vertical distances that the solar concentrator is moved from the nominal position to the aligned position.

14. An apparatus according to claim 10 wherein said processing element determines the elevation command by determining an elevation command angle $\Phi_c$ as follows:

$$\Psi_c = \sin^{-1}(\sin \gamma_1 \cos \Psi_r \cos \Phi_r - \sin \gamma_2 \cos \Psi_r \sin \Phi_r + \sin \Psi_r) - d\Psi$$

wherein $\gamma_1$ and $\gamma_2$ are azimuth rotational tilt errors, $\Psi_r$ and $\Phi_r$ are elevation and azimuth angles, respectively, in an inertial reference system that are required to align the centerline of the solar concentrator and a sun reference vector, and $d\Psi$ is a combination of the elevation transfer function error, the gravitational residual error, and the error due to atmospheric refraction.

15. An apparatus according to claim 10 wherein said processing element determines the azimuth command by determining an azimuth command angle $\Phi_r$, as follows:

$$\Phi_c = \cos^{-1}\left[\frac{AC + BD}{A^2 + B^2}\right] - \Phi_e$$

wherein A, B, C and D are defined as follows:

$A = \cos \lambda \cos \delta_2$ $B = \cos \delta_1 \sin \delta_2 - \sin \delta_1 \cos \delta_2 \sin \lambda$ $C = \cos \gamma_1 \cos \Psi_1 \cos \Phi_r - \sin \gamma_1 \sin \Psi_r$ $D = \sin \gamma_1 \sin \gamma_2 \cos \Psi_r \cos \Phi_r + \cos \gamma_2 \cos \Psi_r \sin \Phi_r + \sin \Psi_r \cos \gamma_1 \sin \gamma_2$ wherein $\lambda$ is defined as follows:

$\lambda = \Psi_c - \Psi_e + g(\Psi_c) + e(\Psi_c) + r(\Psi_c)$ wherein $\Psi_c$ is an elevation command angle, $\Psi_e$ is an elevation reference position error, $g\Psi_c$ is a gravitational residue error, $e\Psi_c$ is an elevation transfer function error and $r\Psi_c$ is an error due to atmospheric refraction, and wherein $\delta_1$ is an elevation rotational tilt error, $\delta_2$ is a reflective surface non-orthogonality error, $\gamma_1$ and $\gamma_2$ are azimuth rotational tilt errors and $\Psi_r$ and $\Phi_r$ are elevation and azimuth angles, respectively, in an inertial reference system that are required to align the centerline of the solar concentrator and a sun reference vector.

16. An apparatus according to claim 10 wherein said measurement system is selected from the group consisting of a sun sensor and a digital image radiometer.

17. An apparatus according to claim 10 wherein said measurement system is adapted to move the solar concentrator from a nominal position to an aligned position at which a difference between gas temperatures of each quadrant of the solar concentrator is minimized and wherein said measurement system is further adapted to determine the horizontal and vertical distances that the solar concentrator is moved from the nominal position to the aligned position.

18. An apparatus for controllably positioning a solar concentrator comprising:

a measurement system for determining a vertical error and a horizontal error between a centerline of the solar concentrator and a sun reference vector;

a processing element, responsive to said measurement system, for determining and elevation command and an azimuth command to compensate for the vertical error and the horizontal error, wherein said processing element determines respective errors generated by a plurality of error sources that contribute to at least one of the vertical error source selected from the group consisting of a gravitational residue error g, an elevation transfer function error e and an error r due to atmospheric refraction, wherein said processing element determines the respective errors by collectively determining the gravitational residue error g, the elevation transfer function error e and the error r due to atmospheric refraction, and wherein said processing element determines the elevation command and the azimuth command at least partially based upon the respective errors generated by the plurality of error sources; and a positioning mechanism, responsive to said processing element, for positioning the solar concentrator based upon the elevation commend and the azimuth command in order to compensate for the vertical error and the horizontal error.

19. A control system for positioning a solar concentrator comprising:

an input section for receiving signals representative of a vertical error and a horizontal error between a centerline of the solar concentrator and a sun reference vector;

a processing element, responsive to said input section, for determining an elevation command and an azimuth command to compensate for the vertical error and the horizontal error, wherein said processing element determines respective errors generated by a plurality of error sources that contribute to at least one of the vertical error and the elevation error, wherein the plurality of error sources include at least one error source selected from a system elevation error group consisting of a gravitational residue error g, an elevation transfer function error e and an error r due to atmospheric refraction, and wherein said processing element determines the respective errors by determining a respective contribution to at least one of the vertical error and the horizontal error that is attributable to at least one error source selected from the system elevation error group and that is independent of ant contribution from any error source outside of the system elevation error group, and wherein said processing element determines the elevation command and the azimuth command at least partially based upon the respective errors generated by the plurality of error sources; and an output section, responsive to said processing element, for providing signals representative of the elevation command and the azimuth command in order to controllably position the solar concentrator so as to compensate for the vertical error and the horizontal error.

20. A control system according to claim 19 wherein said input section repeatedly receives signals representative of the vertical error and the horizontal error at a plurality of different times throughout a day.

21. A control system according to claim 19 wherein said processing element determines the elevation command by determining an elevation command angle $\Psi c$ as follows:

$$\Psi_c = \sin^{-1}(\sin \gamma_1 \cos \Psi_r \cos \Phi_r - \sin \gamma_2 \cos \Psi_r \sin \Phi_r + \sin \Psi_r) - d\Psi$$

wherein $\gamma_1$ and $\gamma_2$ are azimuth rotational tilt errors, $\Psi_r$ and $\Phi_r$ are elevation and azimuth angles, respectively, in an inertial reference system that are required to align the centerline of the solar concentrator and a sun reference vector, and $d\Psi$ is a combination of the elevation transfer function error, the gravitational residual error, and the error due to atmospheric refraction.

22. A control system according to claim 19 wherein said processing element determines the azimuth command by determining an azimuth command angle $\Phi_c$ as follows:

$$\Phi_c = \cos^{-1}\left[\frac{AC + BD}{A^2 + B^2}\right] - \Phi_e$$

wherein A, B, C and D are defined as follows:

$A = \cos \lambda \cos \delta_2$ $B = \cos \delta_1 \sin \delta_2 - \sin \delta_1 \cos \delta_2 \sin \lambda$ $C = \cos \gamma_1 \cos \Psi_1 \cos \Phi_r - \sin \gamma_1 \sin \Psi_r$ $D = \sin \gamma_1 \sin \gamma_2 \cos \Psi_r \cos \Phi_r + \cos \gamma_2 \cos \Psi_r \sin \Phi_r + \sin \Psi_r \cos \gamma_1 \sin \gamma_2$ wherein $\lambda$ is defined as follows:

$\lambda = \Psi_c \Psi_e + g(\Psi_c) + e(\Psi_c) + r(\Psi_c)$ wherein $\Psi_c$ is an elevation command angle, $\Psi_e$ is an elevation reference position error, $g\Psi_c$ is a gravitational residue error, $e\Psi_c$ is an elevation transfer function error and $r\Psi_c$ is an error due to atmospheric refraction, and wherein $\delta_1$ is an elevation rotational tilt error, $\delta_2$ is a reflective surface non-orthogonality error, $\gamma_1$ and $\gamma_2$ are azimuth rotational tilt errors and $\Psi_r$ and $\Phi_r$ are elevation and azimuth angles, respectively, in an inertial reference system that are required to align the centerline of the solar concentrator and a sun reference vector.

23. A control system for positioning a solar concentrator comprising:

an input section for receiving signals representative of a vertical error and a horizontal error between a centerline of the solar concentrator and a sun reference vector;

a processing element, responsive to said input section, for determining an elevation command and an azimuth command to compensate for the vertical error and the horizontal error, wherein said processing element determines respective errors generated by a plurality of error sources that contribute to at least one of the vertical error and the elevation error, wherein the plurality of error sources include at least one error source selected from the group consisting of a gravitational residue error g, and elevation transfer function error e and an error r due to atmospheric refraction, wherein said processing element determines the respective errors by individually determining each of a first azimuth rotational tilt error $\gamma_1$, a second azimuth rotational tilt error $\gamma_2$, a first elevation rotational tilt error $\Phi_e$, a second elevation rotational tilt error $\delta_1$, and a reflective surface non-orthogonality error $\delta_2$, and wherein said processing element determines the elevation command and the azimuth command and the azimuth command at least partially based upon the respective errors generated by the plurality of error sources; and an output section, responsive to said processing element, for providing signals representative of the elevation command and the azimuth command in order controllably position the solar concentrator so as to compensate for the vertical error and the horizontal error.

24. A control system for positioning a solar concentrator comprising:

an input section for receiving signals representative of a vertical error and a horizontal error between a centerline of the solar concentrator and a sun reference vector;

a processing element, responsive to said input section, for determining an elevation command and an azimuth command to compensate for the vertical error and the horizontal error, wherein said processing element determines respective errors generated by a plurality of error sources that contribute to at least one of the vertical error and the elevation error, wherein the plurality of error sources include at least one error source selected from the group consisting of a gravitational residue error g, an elevation transfer function error e and an error r due to atmospheric refraction, wherein said processing element determines the respective errors by collectively determining the gravitational residue error g, the elevation transfer function error e and the error r due to atmospheric refraction, and wherein said processing element determines the elevation command and the azimuth command at least partially based upon the respective errors generated by the plurality of error sources; and an output section, responsive to said processing element, for providing signals representative of the elevation command and the azimuth command in order to controllably position the solar concentrator so as to compensate for the vertical error and the horizontal error.

25. A computer program product for positioning a solar concentrator, the computer program product comprising a computer-readable storage medium having computer-readable program code embodied in said medium, said computer-readable program code comprising:

a first computer-readable program code portion for determining an elevation command and an azimuth command to compensate for the vertical error and the horizontal error between a centerline of the solar concentrator and a sun reference vector, wherein said first computer-readable program code portion comprises:

a second computer-readable program code portion for determining respective errors generated by a plurality of error sources that contribute to at least one of the vertical error and the elevation error, wherein the plurality of error sources include at least one error source selected from a system elevation error group consisting of the gravitational residue error g, the elevation transfer function error e and the error r due to atmospheric refraction, and wherein said second computer-readable program code portion determines the respective errors by determining a respective contribution to at least one of the vertical error and the horizontal error that is attributable to at least one error source selected from the selected from the system elevation error group and that is independent of any contribution from any error source outside of the system elevation error group; and a third computer-readable program code portion, responsive to said second computer-readable program code portion for determining the elevation command and the azimuth command at least partially based upon the respective errors generated by the plurality of error sources, wherein the elevation command and the azimuth command are capable of controllably positioning the solar concentrator so as to compensate for the vertical error and the horizontal error.

26. A computer program product according to claim 25 wherein said first computer-readable program code portion repeatedly determines the elevation command and the azimuth command in response to different vertical errors and horizontal errors at a plurality of different times throughout a day.

27. A computer program product according to claim 25 wherein said second computer-readable program code portion determines the respective errors by individually determining each of a first azimuth rotational tilt error $\gamma_1$, a second azimuth rotational tilt error $\gamma_2$, a first elevation rotational tilt error $\Phi_e$, a second elevation rotational tilt error $\delta_1$, and a reflective surface non-orthogonality error $\delta_2$.

28. A computer program product according to claim 25 wherein said third computer-readable program code portion determines the azimuth command by determining an azimuth command angle $\Phi_c$ as follows:

$$\Phi_c = \cos^{-1}\left[\frac{AC+BD}{A^2+B^2}\right] - \Phi_e$$

wherein A, B, C and D are defined as follows:

$A = \cos \lambda \cos \delta_2$ $B = \cos \delta_1 \sin \delta_2 - \sin \delta_1 \cos \delta_2 \sin \lambda$ $C = \cos \gamma_1 \cos \Psi_1 \cos \Phi_r - \sin \gamma_1 \sin \Psi_r$ $D = \sin \gamma_1 \sin \gamma_2 \cos \Psi_r \cos \Phi_r + \cos \gamma_2 \cos \Psi_r \sin \Phi_r + \sin \Psi_r \cos \gamma_1 \sin \gamma_2$ wherein $\lambda$ is defined as follows:

$\lambda = \Psi_c - \Psi_e + g(\Psi_c) + e(\Psi_c) + r(\Psi_c)$ wherein $\Psi_c$ is an elevation command angle, $\Psi_e$ is an elevation reference position error, $g\Psi_c$ is a gravitational residue error, $e\Psi_c$ is an elevation transfer function error and $r\Psi_c$ is an error due to atmospheric refraction, and wherein $\delta_1$ is an elevation rotational tilt error, $\delta_2$ is a reflective surface non-orthogonality error, $\gamma_1$ and $\gamma_2$ are azimuth rotational tilt errors and $\Psi_r$ and $\Phi_r$ are elevation and azimuth angles, respectively, in an inertial reference system that are required to align the centerline of the solar concentrator and a sun reference vector.

29. A computer program product according to claim 25 wherein said third computer-readable program code portion determines the elevation command by determining an elevation command angle $\Psi_c$ as follows:

$\Psi_c = \sin^{-1}(\sin \gamma_1 \cos \Psi_r \cos \Phi_r - \sin \gamma_2 \cos \Psi_r \sin \Phi_r + \sin \Psi_r) - d\Psi$ wherein $\gamma_1$ and $\gamma_2$ are azimuth rotational tilt errors, $\Psi_r$ and $\Phi_r$ are elevation and azimuth angles, respectively, in an inertial reference system that are required to align the centerline of the solar concentrator and a sun reference vector, and $d\Psi$ is a combination of the elevation transfer function error, the gravitational residual error, and the error due to atmospheric refraction.

30. A computer program product for positioning a solar concentrator, the computer comprising a computer-readable storage medium having computer-readable program product comprising a computer-readable storage medium having computer-readable program code embodied in said medium, said computer-readable program code comprising:

a first computer-readable program code portion for determining an elevation command and an azimuth command to compensate for the vertical error and the horizontal error between a centerline of the solar concentrator and a sun reference vector, wherein said first computer-readable program code portion comprises:

a second computer-readable program code portion for determining respective errors generated by a plurality of error sources that contribute to at least one of the vertical error and the elevation error, wherein the plurality of error sources include at least one error source selected from the group consisting of the gravitational residue error g, the elevation transfer function error e and the error r due to atmospheric refraction, wherein said second computer-readable program code portion determines the respective errors by collectively determining the gravitational residue error g, the elevation transfer function error e and the error r due to atmospheric refraction; and a third computer-readable program code portion, responsive to said second computer-readable program code portion for determining the elevation command and the azimuth command at least partially based upon the respective errors generated by the plurality of error sources, wherein the elevation command and the azimuth command are capable of controllably positioning the solar concentrator so as to compensate for the vertical error and the horizontal error.

* * * * *